US008473566B1

(12) United States Patent
Cardente et al.

(10) Patent No.: US 8,473,566 B1
(45) Date of Patent: Jun. 25, 2013

(54) METHODS SYSTEMS, AND COMPUTER PROGRAM PRODUCTS FOR MANAGING QUALITY-OF-SERVICE ASSOCIATED WITH STORAGE SHARED BY COMPUTING GRIDS AND CLUSTERS WITH A PLURALITY OF NODES

(75) Inventors: John T. Cardente, Milford, MA (US); James T. Compton, Durham, NC (US); Michael B. Evans, Upton, MA (US); Stephen A. Fridella, Belmont, MA (US); Uday K. Gupta, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 1348 days.

(21) Appl. No.: 11/479,939

(22) Filed: Jun. 30, 2006

(51) Int. Cl.
*G06F 15/167* (2006.01)
*H04L 1/00* (2006.01)

(52) U.S. Cl.
USPC ........... 709/216; 709/213; 709/214; 709/215; 370/252

(58) Field of Classification Search
None
See application file for complete search history.

(56) References Cited

U.S. PATENT DOCUMENTS

| 4,654,654 | A | | 3/1987 | Butler et al. |
| 5,490,270 | A | * | 2/1996 | Devarakonda et al. ....... 707/201 |
| 5,848,434 | A | | 12/1998 | Young et al. |
| 6,044,367 | A | | 3/2000 | Wolff |
| 6,339,793 | B1 | * | 1/2002 | Bostian et al. ................. 709/229 |
| 6,578,121 | B1 | | 6/2003 | Schutzman |
| 6,694,368 | B1 | * | 2/2004 | An et al. ........................ 709/227 |
| 6,760,823 | B1 | | 7/2004 | Schutzman |
| 6,886,086 | B2 | * | 4/2005 | Kobayashi et al. ........... 711/162 |
| 6,934,725 | B1 | | 8/2005 | Dings |
| 7,107,273 | B2 | * | 9/2006 | Ohata et al. ........................... 1/1 |
| 7,185,070 | B2 | * | 2/2007 | Paul et al. ..................... 709/220 |
| 7,275,103 | B1 | * | 9/2007 | Thrasher et al. .............. 709/224 |
| 7,577,729 | B1 | * | 8/2009 | Umbehocker et al. ........ 709/223 |
| 7,606,146 | B1 | * | 10/2009 | Pan et al. ....................... 370/229 |
| 7,676,628 | B1 | | 3/2010 | Compton et al. |
| 2002/0049778 | A1 | | 4/2002 | Bell et al. |
| 2002/0174315 | A1 | * | 11/2002 | Yamamoto .................... 711/170 |

(Continued)

OTHER PUBLICATIONS

Commonly-assigned, co-pending U.S. Appl. No. 11/394,768 for "Methods, Systems, and Computer Program Products for Providing Access to Shared Storage by Computing Grids and Clusters with Large Numbers of Nodes," (filed Mar. 31, 2006).

(Continued)

*Primary Examiner* — Faruk Hamza
*Assistant Examiner* — Andrew Oh
(74) *Attorney, Agent, or Firm* — Jenkins, Wilson, Taylor & Hunt, P.A.

(57) ABSTRACT

Methods, systems, and computer program products for managing quality of service for shared storage accessed by a plurality of nodes are disclosed. According to one method, at a node of a plurality of nodes sharing access to a first disk array, quality-of-service (QoS) metadata associated with a portion of the disk array are requested from a server, wherein the QoS metadata includes at least one performance criterion for the portion of the disk array. I/O performance is monitored for the portion of the disk array in response to receiving the QoS metadata. The monitored I/O performance is compared with the QoS metadata. Based upon the comparison of the monitored I/O performance with the QoS metadata, it is determined whether a QoS violation has occurred. In response to determining that a QoS violation has occurred, the server is requested to migrate data associated with the portion of the disk array.

45 Claims, 16 Drawing Sheets

U.S. PATENT DOCUMENTS

| | | |
|---|---|---|
| 2003/0018606 A1* | 1/2003 | Eshel et al. ............... 707/1 |
| 2003/0135609 A1* | 7/2003 | Carlson et al. ............ 709/224 |
| 2003/0145086 A1* | 7/2003 | O'Reilly ................... 709/226 |
| 2003/0188097 A1 | 10/2003 | Holland et al. |
| 2004/0139191 A1* | 7/2004 | Chambliss et al. ........ 709/224 |
| 2004/0181594 A1* | 9/2004 | Suleiman ................. 709/225 |
| 2004/0268064 A1 | 12/2004 | Rudelic |
| 2005/0076154 A1* | 4/2005 | Chambliss et al. ........ 710/1 |
| 2005/0210137 A1* | 9/2005 | Taguchi ................... 709/227 |
| 2006/0036602 A1 | 2/2006 | Unangst et al. |
| 2006/0101130 A1* | 5/2006 | Adams et al. ............ 709/218 |
| 2006/0107098 A1* | 5/2006 | Maki et al. .............. 714/6 |
| 2006/0126639 A1* | 6/2006 | Bozak et al. ............. 370/395.21 |
| 2006/0206603 A1* | 9/2006 | Rajan et al. ............. 709/223 |
| 2006/0206662 A1 | 9/2006 | Ludwig et al. |
| 2006/0242283 A1* | 10/2006 | Shaik et al. ............. 709/223 |
| 2006/0271677 A1* | 11/2006 | Mercier .................. 709/224 |
| 2007/0027985 A1* | 2/2007 | Ramany et al. .......... 709/224 |
| 2007/0067435 A1* | 3/2007 | Landis et al. ........... 709/224 |
| 2007/0130344 A1* | 6/2007 | Pepper .................. 709/227 |
| 2007/0143497 A1* | 6/2007 | Kottomtharayil et al. ... 709/238 |
| 2008/0120462 A1* | 5/2008 | Nehse ................... 711/114 |

OTHER PUBLICATIONS

Notice of Allowance and Fee(s) Due for U.S. Appl. No. 11/394,768 (Oct. 22, 2009).

Notice of Allowance and Fee(s) Due for U.S. Appl. No. 11/394,768 (Jul. 9, 2009).

Non-Final Official Action for U.S. Appl. No. 11/394,768 (Oct. 15, 2008).

* cited by examiner

METHODS SYSTEMS, AND COMPUTER PROGRAM PRODUCTS FOR MANAGING QUALITY-OF-SERVICE ASSOCIATED WITH STORAGE SHARED BY COMPUTING GRIDS AND CLUSTERS WITH A PLURALITY OF NODES

RELATED APPLICATIONS

This application is related to commonly assigned, co-pending U.S. patent application Ser. No. 11/394,768, filed on Mar. 31, 2006, the disclosure of which is incorporated herein by reference in its entirety.

TECHNICAL FIELD

The subject matter described herein relates to providing quality of service management in a multiple computer environment. More particularly, the subject matter described herein relates to methods, systems, and computer program products for managing quality-of-service associated with storage shared by computing grids and clusters with a plurality of nodes.

BACKGROUND

Sharing of access to physical disk storage and virtualization of input/output (I/O) address space among client nodes within grids or clusters are commonly managed by distributed logical volume managers or inline appliances. These distributed logical volume managers and inline appliances provide a centralized logical view of the physical disk address space that is shared within shared access volumes by these client nodes.

Quality of service (QoS) management functions for these shared access volumes for monitoring QoS metrics associated with the volumes, such as I/O performance, cost, and security, have traditionally been performed in a centralized fashion by either distributed logical volume managers or inline appliances. With the distribution of disk access capabilities associated with shared access volumes to client nodes within the grids or clusters of computing nodes, QoS monitoring by a central node can cause performance problems.

Service level agreements (SLAs) are arrangements related to I/O operations for shared access volumes and are based upon one or more QoS parameters, each defining operational boundaries for I/O operations on the shared access volumes. In conventional systems, QoS monitoring related to SLA agreements is centralized, which can cause performance problems with distributed access to shared storage by large numbers of nodes.

Data management services related to fulfillment of these SLAs, such as migration of data between back-end storage devices, have also traditionally been centralized. Data I/O rates may differ between client nodes depending upon the application running on each of the different client nodes within a grid or cluster. Because physical disks accessed by grids or clusters of nodes may have different I/O parameters and different performance levels, data migration may be used to move data that is found to be accessed more frequently from lower performing disks to higher performing disks. Additionally, infrequently used data may be migrated to lower cost or lower performance storage to allow higher performance storage to be available for data that is accessed more frequently. Accordingly, data management functionality may be used to refine system performance over time. Unfortunately, with the distribution of disk access capabilities associated with shared access volumes to client nodes within the grids or clusters, centralized control of data management can result in performance problems.

Accordingly, in light of these difficulties associated with conventional centralized QoS management, there exists a need for methods, systems, and computer program products for managing quality-of-service associated with storage shared by computing grids and clusters with a plurality of nodes.

SUMMARY

The subject matter described herein includes methods, systems, and computer program products for managing quality of service for shared storage accessed by a plurality of nodes. One method includes, at a node of a plurality of nodes sharing access to a first disk array, requesting first quality-of-service (QoS) metadata associated with a first portion of the first disk array from a server, wherein the first QoS metadata includes at least one performance criterion for the first portion of the first disk array. The first QoS metadata is received at the node. I/O performance for the first portion of the first disk array is monitored. The monitored I/O performance is compared with the first QoS metadata. Based upon a comparison of the monitored I/O performance with the first QoS metadata, it is determined whether a QoS violation has occurred, and in response to determining that a QoS violation has occurred, migration of data associated with the first portion of the first disk array is effected.

The term "QoS metadata" as used herein includes any data related to performance of a disk array. Examples of QoS metadata will be described below.

The subject matter described herein for providing for managing quality of service for shared storage accessed by a plurality of nodes may be implemented using a computer program product comprising computer executable instructions embodied in a computer-readable medium. Exemplary computer-readable media suitable for implementing the subject matter described herein include chip memory devices, disk memory devices, programmable logic devices, and application specific integrated circuits. In addition, a computer-readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

In view of the problems described above with respect to centralized QoS and data migration management, the subject matter described herein provides distributed QoS metadata management and distributed data migration management in computing grids and clusters with a plurality of nodes. Where previously activities and metadata related to QoS were managed by a centralized server, the methods, systems, and computer program products described herein decentralize the management of QoS metadata and data migration by distributing the QoS metadata to the client nodes within the computing grids and clusters and by performing QoS metadata management and, in some cases, data migration at the client nodes. By providing client nodes that perform QoS metadata management and data migration, performance improvements may be realized.

By distributing QoS metadata associated with shared storage to client nodes, decisions related to performance, cost, and security may be made at the client nodes. When a client node detects that a QoS metadata parameter is not being met by the disks that are being accessed for I/O operations, the client node may request that the data be migrated to physical disks that are more suitable for the performance requirements associated with the QoS metadata that was violated. In response to a data migration request, a server may either migrate the data itself or it may delegate the migration task to a client node, including the requesting node.

Figure 1:
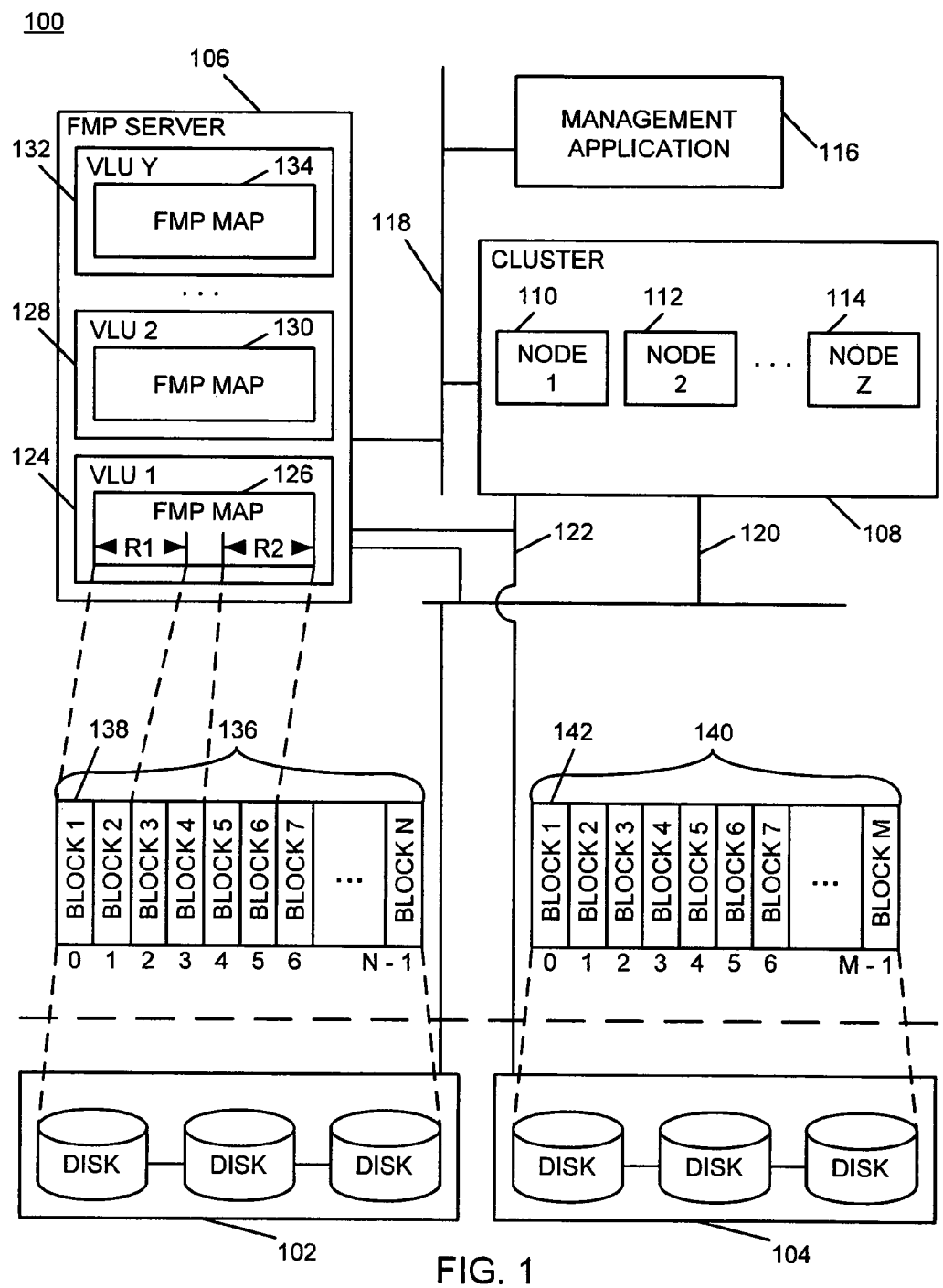
FIG. 1 is a block diagram of an exemplary cluster computing system for providing distributed QoS metadata management and distributed data migration management in computing grids and clusters with large numbers of nodes according to an embodiment of the subject matter described herein.

FIG. 1 illustrates an exemplary cluster computing system 100 for providing distributed QoS metadata management and distributed data migration management in computing grids and clusters with large numbers of nodes. In the illustrated example, system 100 includes RAID arrays 102 and 104, which provide physical storage disks. A fragment mapping protocol (FMP) server 106 provides a centralized tracking service for tracking allocations of storage blocks and distribution of QoS metadata for virtual logical units (VLUs). A VLU is a data structure used to track allocation of storage in RAID arrays 102 and 104. A cluster 108 of computing nodes shares access to storage provided by RAID arrays 102 and 104 and performs distributed QoS management associated with the shared access. In the illustrated example, a node 1 110, a node 2 112, up to a node Z 114 form cluster 108.

A management application 116 may provide configuration and management services for FMP server 106 and for the client nodes within cluster 108. For example, management application 116 may designate a quality of service for applications running on the client nodes within cluster 108. These applications may include database (DB) applications and network attached storage (NAS) applications, each of which may provide different performance characteristics. For example, database applications may be configured to provide a relatively high QoS while an NAS server may be configured and may perform with a lower QoS. Management application 116 may further map VLUs associated with FMP server 106 to storage regions within RAID arrays 102 and 104 identified as capable of providing a desired quality of service.

FMP server 106, management application 116, and cluster 108 may be interconnected via an Internet protocol (IP) network 118. IP network 118 may allow nodes within cluster 108 to request VLU mappings and QoS metadata from FMP server 106 and may allow FMP server 106 to return VLU maps including logical and physical disk information and QoS metadata to nodes within cluster 108.

A storage area network (SAN) 120 and an IP network 122 may provide connectivity between cluster 108, FMP server 106, and RAID arrays 102 and 104. SAN 120 may be a fiber channel (FC) SAN, an IP SAN, or may implement IP over a fiber channel physical interface without departing from the scope of the subject matter described herein. Further, SAN 120 and IP network 122 may also be interchanged or both may be combined to form a single network. Accordingly, FMP server 106 and nodes within cluster 108 may use an FC SAN or an IP SAN, or a combination FC/IP SAN or an IP network to interface with RAID arrays 102 and 104. For ease of illustration, SAN 120 and IP network 122 are each represented by single interconnections in FIG. 1.

FMP server 106 may use SAN 120 or IP network 122 to access physical disks for storage of allocation tracking metadata, including VLU maps and allocation information, and for storage of QoS metadata. Cluster 108 may use SAN 120, IP network 122, the VLU maps, allocation information, and QoS metadata provided by FMP server 106 to perform direct disk accesses within RAID arrays 102 and 104 and to monitor quality of service for the accesses.

Although the example illustrated in FIG. 1 includes RAID arrays 102 and 104, any disk arrangement may be used in place of RAID arrays 102 and 104 as shared storage. For example, an arrangement known as just a bunch of disks/drives (JBOD) or a single disk may be used as shared storage without departing from the scope of the subject matter described herein.

VLUs may be used to represent logical storage regions within system 100. VLUs may be mapped to nodes within cluster 108 and multiple nodes may access a VLU. Client nodes may access physical disks within RAID arrays 102 and 104 using information provided by FMP server 106 and may monitor QoS parameters associated with the physical disks, as will be described in more detail below.

Within FMP server 106, a VLU 1 124 includes an FMP map 126, a VLU 2 128 includes an FMP map 130, and a VLU 132 includes an FMP map 134. As described above and in more detail below, each VLU within FMP server 106 may represent a logical storage region within system 100 and may map to physical storage space within RAID arrays 102 and 104.

A data storage pool 136 represents a logically contiguous view of a portion of physical RAID array 102, and as such, provides a mapping of storage extents 138 onto RAID array 102. A data storage pool 140 represents a logically contiguous view of a portion of physical RAID array 104, and as such, provides a mapping of storage extents 142 onto RAID array 104. For simplification, data storage pools 136 and 140 are illustrated as logical layers that reside adjacent to RAID arrays 102 and 104, respectively, and which may include physical disks. However, it is understood that one or more logical layers, such as aggregations of RAID arrays, aggregations of pools 136 and 140, and aggregations of RAID groups, may reside between data storage pools 136 and 140 and the physical disks that make up RAID arrays 102 and 104, respectively, without departing from the scope of the subject matter described herein.

As storage blocks are allocated from data storage pools 136 and 140, they may be tracked using an FMP map, such as FMP map 126 within VLU 1 124, along with QoS metadata associated with the VLU. Storage blocks 138 may be allocated individually or as contiguous groupings. An allocation of a storage block or a contiguous group of storage blocks will be referred to as an allocation of a "storage extent" herein. Accordingly, an allocated storage extent may include one or more physical storage blocks within RAID arrays 102 and 104.

Client nodes within cluster 108, such as node 1 110, may be configured to either request QoS metadata or not to request QoS metadata from FMP server 106. Client nodes may become associated with a VLU when configured by management application 116. When client nodes request physical disk access mappings for a region of a VLU, the client nodes may also request QoS metadata for the region. Further, client nodes may request QoS metadata separately from an access map request. In either case, FMP server 106 may provide QoS metadata for the region of the VLU to the client node. The client node may then directly access the physical disks associated with the region and may monitor QoS performance associated with input/output (I/O) disk access operations (e.g., read operations and write operations) directly in a distributed fashion without centralization of the QoS monitoring and management functions.

The QoS metadata provided by FMP server 106 may be used by a client node, such as node 1 110, to monitor I/O properties associated with the disk access operations. Node 1 110 may compare the monitored I/O performance values with the QoS metadata to determine whether a QoS violation has occurred and may issue a QoS violation message including a migration request to a server, such as FMP server 106.

Exemplary QoS properties that may be represented within QoS metadata include a maximum average response time for read operations, a maximum average response time for write operations, a maximum response time for read operations, a maximum response time for write operations, a minimum throughput of read operations per unit time, and a minimum throughput of write operations per unit time. A threshold for each of these performance criterion may be defined. For example, a minimum write throughput of 50 megabytes per second may be defined. Monitored I/O performance values may be compared with the threshold. A QoS violation may be determined to exist when a comparison of the threshold with the QoS metadata identifies that the threshold has been exceeded. A threshold may be defined as a minimum or a maximum threshold.

Further, a variance tolerance may be defined for a QoS metadata performance criterion, such as a ten percent (10%) variance tolerance, and a weighted average for a plurality of monitored I/O performance values may be calculated. A QoS violation may be determined to exist when a comparison of the weighted average with the variance tolerance identifies a variance associated with the weighted average that is larger than the variance tolerance. As well, a fuzzy logic algorithm based upon a performance criterion may be defined and the fuzzy logic algorithm may be executed on the monitored I/O performance to indicate that the QoS metadata parameter is in danger of being exceeded. Probabilistic pattern matching may also be used to identify potential QoS violations.

Determinations of QoS violations may also include a determination that a portion of the data associated with the portion of the disk array resides on disparately performing storage devices, a determination that a portion of the data associated with the portion of the disk array is accessed more frequently than a second portion of the data, a determination that at least a portion of the data associated with a portion of the disk array is stored on storage devices with different cost attributes, and a determination that a portion of the data associated with a portion of the disk array is stored on storage devices with different security attributes. Devices may be considered to be disparately performing when access times or I/O rates differ between physical devices. A threshold for a performance variation may be defined, such as a ten percent variation in access speed between devices, and that threshold may be used to identify devices that are disparately performing.

As will be described in more detail below, when a client node, such as node 1 110, determines that a QoS metadata value has been violated, the client node may notify FMP server 106 of the violation and may request that FMP server 106 initiate a migration of the data to storage with a higher QoS capability. In order to initiate a migration of the data associated with a region of a VLU, FMP server 106 may revoke mappings for all client nodes with mappings to the region of the VLU associated with the violation. FMP server 106 may identify a destination location within accessible storage having sufficient QoS parameters, such as RAID arrays 102 and 104. Upon acknowledgement of revocation of all mappings from the client nodes, FMP server 106 may initiate a migration of the data to the identified destination location from the source location associated with the QoS violation. FMP server 106 may migrate the data itself or may choose to offload the migration task to a "worker server," which may be any client node, including the requesting node.

Client nodes may continue to request mappings and QoS metadata for regions as application-level I/O operations are requested at the client nodes. These requests may occur before or after the data migration has completed. A client node may request an I/O mapping and QoS metadata from FMP server 106. FMP server 106 may queue these requests and may fulfill them after the migration has complete. Alternatively, client nodes may queue I/O requests and may have queue depth (e.g., 10) to allow requests to be issued after the migration has completed. If a queue depth has been exceeded at a client node, appropriate error handling may be requested at the client nodes (e.g., the client may wait or may reissue the requests).

Notification messages may be sent from FMP server 106 to any client nodes with revoked mappings when a migration operation has completed. The client nodes may be configured to re-issue requests for I/O mappings and QoS metadata for the revoked regions in response to a notification message or they may be configured to issue new requests when a new application-level I/O operation is requested. FMP server 106 may respond to requests with a storage extent including new I/O mappings and QoS metadata for the region of a VLU associated with a request.

For purposes of illustration, it will be assumed that regions R1 and R2 within FMP map 126 of VLU 1 124 are mapped to blocks 1 and 2 and blocks 5 and 6, respectively, of data storage pool 136 within RAID array 102. The dashed lines between FMP map 126 and storage pool 136 in FIG. 1 illustrate these mappings.

Figure 2:
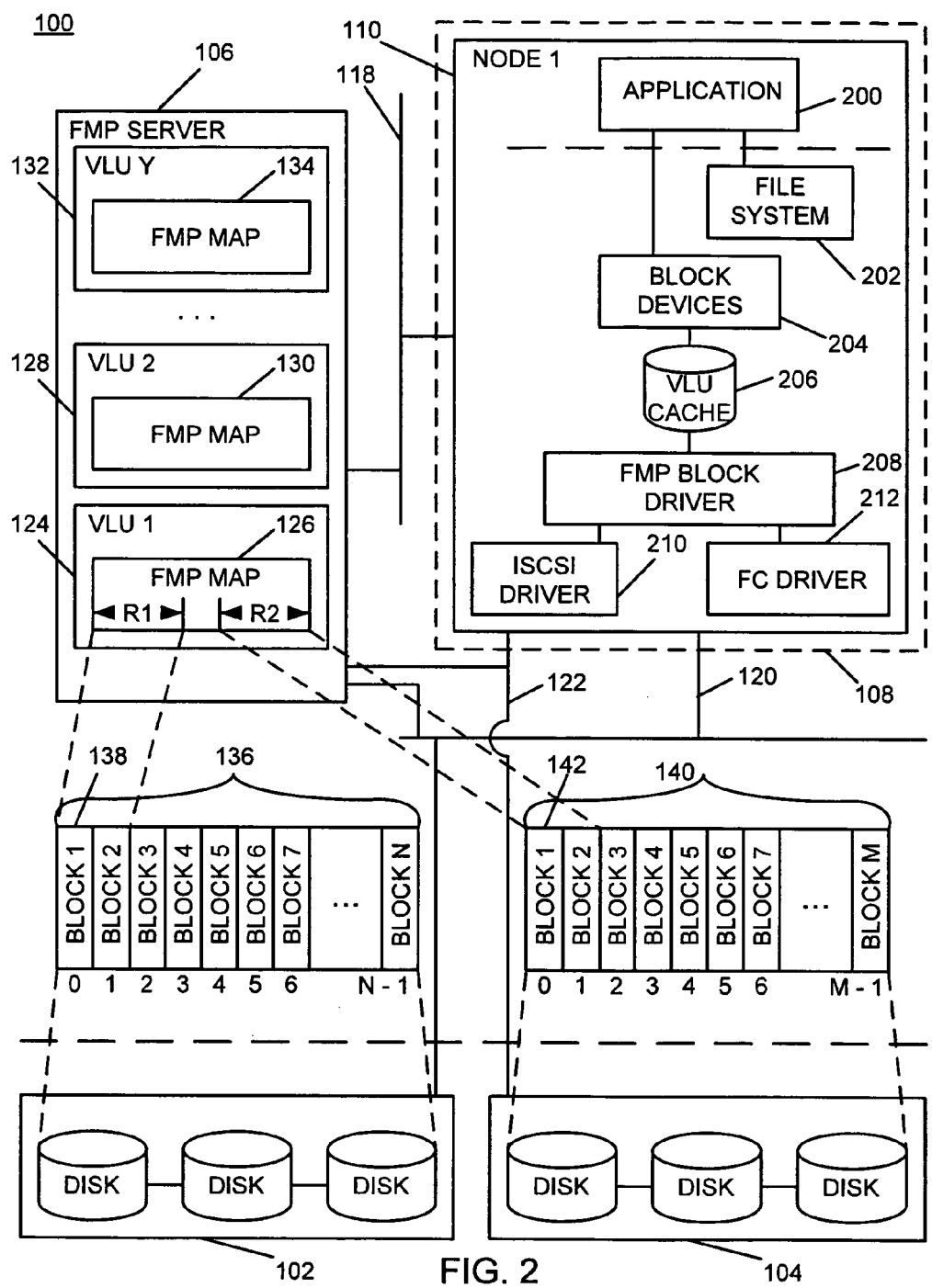
FIG. 2 is a block diagram of the exemplary cluster computing system for providing distributed quality of service management for a cluster processing environment illustrating exemplary details of a node within the cluster of nodes according to an embodiment of the subject matter described herein.

FIG. 2 illustrates exemplary cluster computing system 100 for providing distributed QoS metadata management and distributed data migration management in computing grids and clusters with large numbers of nodes with a detailed view of a node, client node 1 110, within cluster 108. Management application 116 is not shown within FIG. 2 in order to better illustrate modules and components within node 1 110. Within node 1 110, an application 200 may perform application level functions within node 1 110. Application 200 may interface with a file system 202 for file-based storage mappings. Application 200 may also directly interface with a block devices module 204 in order to generate I/O requests at a block level for I/O operations requested by application 200.

Block devices module 204 may access I/O mapping and QoS information for regions of a mapped VLU, such as VLU 1 124, via a VLU cache 206. VLU cache 206 may store I/O mappings for storage extents associated with regions of VLU 1 124 and may store QoS metadata associated with those storage extents and regions.

An FMP block driver 208 is a disk interface device that may used by block devices module 204 along with VLU cache 206 in order to carry out I/O operations on behalf of application 202. As will be described in more detail below, VLU cache 206 may store read mappings, write mappings, and read/write mappings including physical address mappings to allow direct disk access by node 1 110 to physical blocks within disks of RAID arrays 102 and 104. VLU cache 206 may also store QoS metadata associated with storage extents defined within VLU 1 124.

FMP block driver 208 may interface with storage blocks within RAID arrays 102 and 104 by obtaining physical block addresses for an I/O operation from VLU cache 206 and providing the physical block addresses to lower-level drivers to perform disk accesses directly without further interaction with FMP server 106. FMP block driver 208 may interface with storage blocks via an Internet small computer system interface (ISCSI) driver 210 or a fiber channel (FC) driver 212 to directly access physical storage for read and write operations. ISCSI driver 210 and FC driver 212 may perform low-level disk access functions for node 1 110 and may communicate over SAN 120 or LAN 122 to perform direct disk operations on storage blocks within disks of RAID arrays 102 and 104.

It is understood that many other disk interface protocols may be used to implement the communications described herein. For example, small computer systems interface (SCSI), fiber channel protocol (FCP) and any other protocol available to client platforms, including remote direct memory access (RDMA), Infiniband, and others or combinations of the above may be used. Accordingly, all are considered within the scope of the subject matter described herein.

FMP block driver 208 may utilize the QoS metadata stored within VLU cache 206 and associated with a region of a mapped VLU, such as VLU 1 124, in order to monitor I/O performance for the region. Monitoring of performance for a region may include comparing the monitored I/O performance with the stored QoS metadata and determining, based upon the comparison of the monitored I/O performance with the QoS metadata, whether a QoS violation has occurred. In response to determining that a QoS violation has occurred, FMP block driver 208 may generate a request to FMP server 106 requesting that data associated with the region of the VLU be migrated. FMP block driver 208 may generate information and store it within VLU cache 206. For example, FMP block driver 208 may calculate average I/O performance parameters and may use that information to determine whether a QoS violation has occurred. As an alternative to FMP block driver 208 communicating QoS violations to FMP server 106, FMP block driver 208 may be configured to flag QoS violations within VLU cache 206, and block devices module 204 may be responsible for communication related to QoS violations.

For purposes of illustration, it will be assumed that a QoS violation for region R2 within FMP map 126 of VLU 1 124 was identified by node 1 110 and that node 1 110 requested that FMP server 106 migrate the data associated with region R2. Further, it will be assumed that the migration operation was completed and that data associated with region R2 has been migrated to blocks 1 and 2 of data storage pool 140 within RAID array 104 in response to the request. This re-mapping as a result of the migration operation is illustrated by the dashed lines in FIG. 2 from region R2 to blocks 1 and 2 of data storage pool 140 within RAID array 104. An exemplary migration operation will be described in more detail below.

Figure 3:
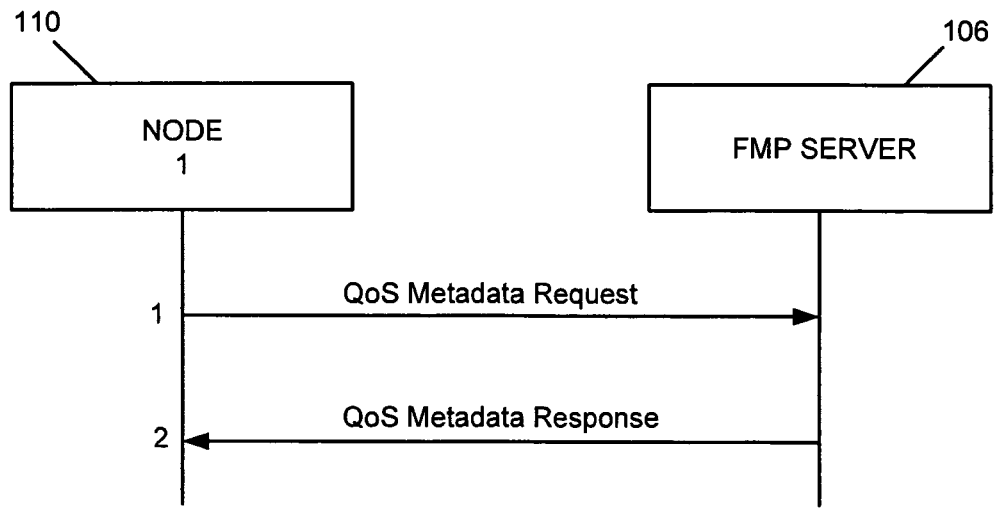
FIG. 3 is a message flow diagram illustrating exemplary messages associated with a QoS metadata request according to an embodiment of the subject matter described herein.

FIG. 3 is a message flow diagram illustrating exemplary messages associated with a QoS metadata request by a client node to FMP server 106 according to an embodiment of the subject matter described herein. Referring to FIG. 3, in line 1 of the message flow diagram, node 1 110 formulates a QoS request message and sends it to FMP server 106. In line 2, FMP server 106 formulates a QoS response message and sends it to node 1 110. Though not depicted in FIG. 3, both the QoS request message of line 1 and the QoS response message of line 2 may include parameters for identifying a region or extent of a VLU which is already mapped at node 1 110. The QoS response message of line 2 may also include QoS metadata for an identified region or extent of a VLU that is already mapped at node 1 110. Details of exemplary QoS metadata parameters will be described in detail below.

As described above, client nodes, such as node 1 110, may be mapped to a VLU, such as VLU 1 124, when configured by management application 116 and this mapping may be provided to FMP server 106. Accordingly, when a message is generated by a client node and sent to FMP server 106, FMP server 106 may use source information included with the message to identify the appropriate VLU associated with the sending client node using the information provided by management application 116. In such a case, parameters used to identify the VLU may be omitted from the message. Exemplary parameters that may be used to pass storage extent physical disk access information and QoS metadata will be described in more detail below.

Figure 4:
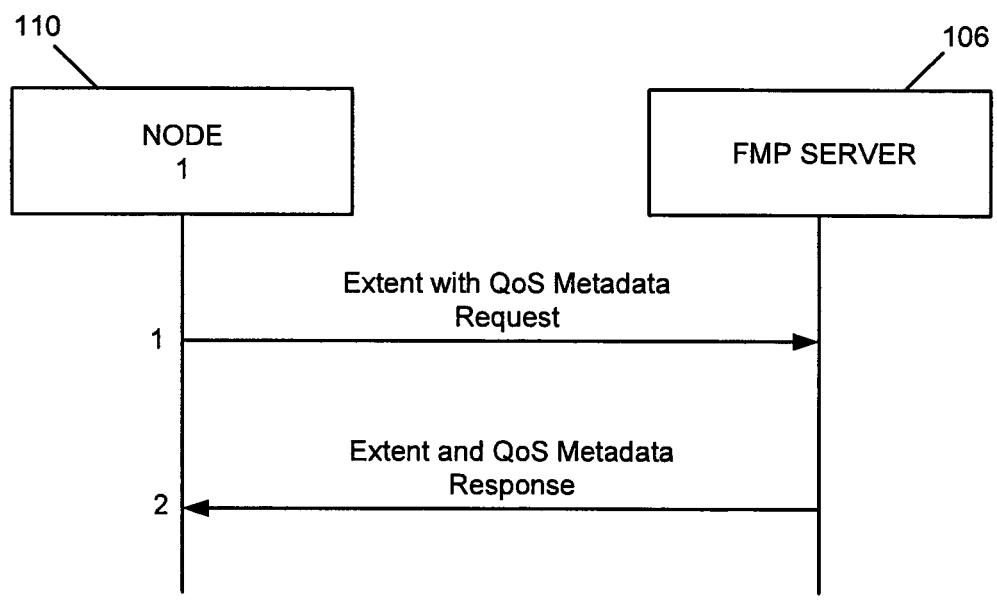
FIG. 4 is a message flow diagram illustrating exemplary messages associated with a request for a storage extent including a request for QoS metadata according to an embodiment of the subject matter described herein.

In one exemplary implementation, QoS metadata may be communicated to client nodes in combination with storage extent information requested by the client nodes. FIG. 4 is a message flow diagram illustrating exemplary messages associated with a request for a storage extent combined with a request for QoS metadata. Referring to FIG. 4, in line 1 of the message flow diagram, node 1 110 formulates an extent with QoS request message and sends it to FMP server 106. In line 2, FMP server 106 formulates an extent and QoS response message and sends it to node 1 110. As with FIG. 3, parameters associated with the messages in FIG. 4 have been excluded in order to simplify the description of the message flows.

Figure 5:
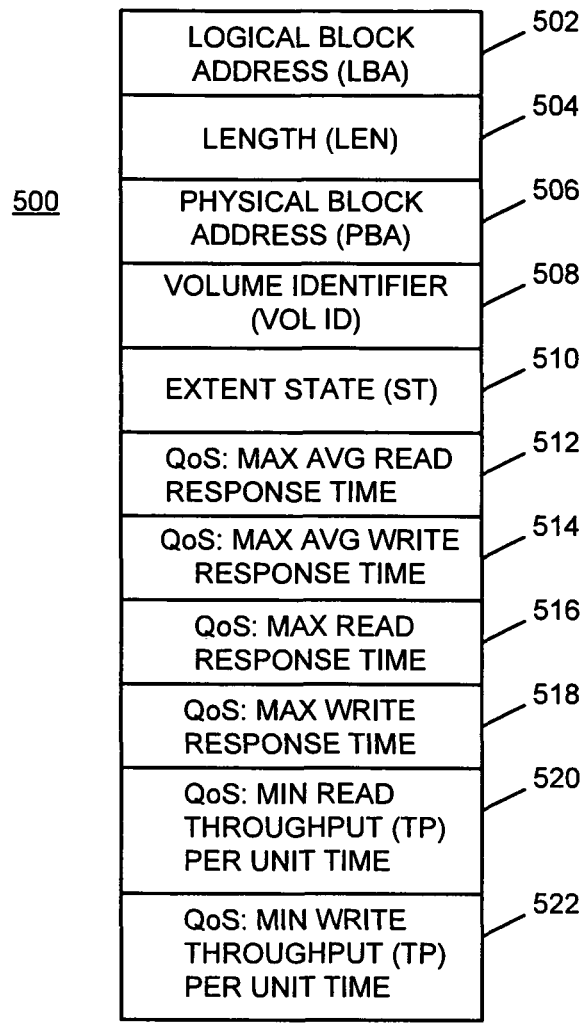
FIG. 5 illustrates an exemplary storage extent identifier data structure for identifying logical and physical characteristics and QoS metadata that are associated with a storage extent according to an embodiment of the subject matter described herein.

FIG. 5 illustrates an exemplary storage extent identifier data structure 500 for identifying logical and physical characteristics and QoS metadata that are associated with a storage extent within system 100. Storage extent identifier data structure 500 may be used within cluster computing system 100 to identify a disk mapping within RAID array 102 or RAID array 104 for a storage extent and may associate that disk mapping with the logical address mapping for the storage extent within a VLU. One or more storage extent identifier data structures 500 may be associated with each other to form a logical map, such as FMP map 126 associated with VLU 1 124, for a VLU. Within storage extent identifier data structure 500 a logical block address (LBA) 502 may be used to identify a logical location within VLU 1 124 for a storage extent represented by storage extent identifier data structure 500. A length (LEN) 504 may represent the number of logical file blocks of disk storage that are represented by the storage extent associated with storage extent identifier data structure 500.

A physical block address (PBA) 506 may represent a physical address within a disk of RAID array 102 or RAID array 104 for the first physical block of the storage extent represented by storage extent identifier data structure 500. A volume identifier (VOL ID) 508 may be used to identify the physical volume label for the disk within RAID array 102 or RAID array 104. An extent state (ST) 510 may be used to indicate the current state of a storage extent represented by storage extent identifier data structure 500. Three states are defined for storage extents at client nodes and FMP server 106. The states are "valid," "invalid," and "none." A fourth state is defined for a storage extent at FMP server 106. The fourth state is "revoke" that may be used to indicate a storage extent that is in the process of being migrated and that has been revoked at the client nodes.

A storage extent may be considered valid when space for the storage extent has been allocated within each of a logical FMP map, such as FMP map 126, a logical data storage pool, such as data storage pool 136, and a physical RAID array of physical disks, such as RAID array 102 or RAID array 104. A commit operation may be issued by a client node to FMP server 106 to set a state of valid for a storage extent.

A storage extent may be considered to have an invalid state when physical space has been provisionally allocated within a RAID array by FMP server 106 before data has been stored to the storage extent and a commit operation has been performed. For example, when a cluster node, such as node 1 110, requests a writable map from FMP server 106, a storage extent of sufficient size to accommodate the request may be allocated within RAID array 102 as represented within data storage pool 136 and may be identified within a provisional FMP map, with a storage extent identifier data structure 500. Because storage extents are allocated within system 100 in response to write requests from nodes within cluster 108 without further interaction between client nodes and FMP server 106 to write data to the physical storage devices, an "invalid" state may appear in a "writeable" map. As described above, a storage extent may be considered invalid prior to a commit operation. However, given that physical disk space has been allocated for an invalid storage extent in response to a write request and prior to a commit operation, data may be safely written to the location by node 1 110. In order for data within the storage extent to be considered valid, node 1 110 may perform a "commit" operation to inform FMP server 106 that the extent may be promoted from a provisional allocation to an allocation within FMP map, such as FMP map 126. Metadata may be updated within FMP map 126 for a logical storage region of a VLU.

A third possible state for a storage extent is "none." A state of none indicates that the associated logical storage region has not been allocated within a RAID array, such as RAID array 102 or RAID array 104. The logical region may be considered "sparse" for purposes of this description. Without physical storage, write operations to logical regions associated with storage extents in the "none" state may be disallowed. Accordingly, write maps do not need to contain mappings to regions that are unallocated. Only read maps may usefully employ regions with a state of none. Read operations for these regions may return zero-filled buffers without allocation of a storage extent for the logical region. This sparse provisioning of logical storage extents within system 100 may provide an efficient means for storage utilization and may allow compact representations of logical address spaces within VLUs. As described above, read requests to unallocated regions within a logical FMP map, such as FMP map 126, may return zero-filled buffers. Accordingly, a storage extent state of "none" may appear in "readable" maps.

As will be described in more detail below, FMP server 106 may return storage extent mappings to a client node in the form of "readable" and "writeable" mappings. The client node may store these mappings separately within VLU cache 206 and may also combine the mappings within VLU cache 206, as will be described in more detail below, to form a read/write mapping for the associated storage extent. Accordingly, FMP server 106 may provide read and write mappings, and a client node may manage mappings provided by FMP server 106 to form read/write regions of the logical address spaces represented by storage extents returned within readable and writeable mappings from FMP server 106. Entries within a read/write map may be created after a commit operation has been successfully completed. Because writeable regions that have been committed may be considered valid, read/write maps managed within VLU cache 206 by a client node may be considered to have a state of "valid" for any storage extents represented.

Returning to FIG. 5, data structure 500 may also store QoS metadata associated with shared storage. For example, a maximum average read response time QoS metadata parameter 512 may represent the maximum desirable average read response time for a storage extent represented by a storage extent defined by the use of storage extent identifier data structure 500. A maximum average write response time QoS metadata parameter 514 may represent the maximum desirable average write response time for a storage extent defined by the use of storage extent identifier data structure 500. A maximum read response time QoS metadata parameter 516 may represent the maximum desirable read response time for a storage extent defined by the use of storage extent identifier data structure 500. A maximum write response time QoS metadata parameter 518 may represent the maximum desirable write response time for a storage extent defined by the use of storage extent identifier data structure 500. A minimum read throughput per unit time QoS metadata parameter 520 may represent the minimum desirable read throughput per unit time for a storage extent defined by the use of storage extent identifier data structure 500. A minimum write throughput per unit time QoS metadata parameter 522 may represent the minimum desirable write throughput per unit time for a storage extent defined by the use of storage extent identifier data structure 500. Additional QoS metadata parameters may be defined for a storage extent without departing from the scope of the subject matter described herein.

A storage extent identifier data structure, such as storage extent identifier data structure 500, may be returned by FMP server 106 as a parameter in an extent and QoS response message, such as the extent and QoS response message described above in association with line 2 of FIG. 4. In this way, storage extents may be defined and communicated between FMP server 106 and client nodes within cluster 108.

A subset of the identifiers described in association with storage extent identifier data structure 500 may be returned in response to a QoS request. For example, a data structure may be formulated by FMP server 106 including QoS metadata parameters 512 through 522 and returned within a QoS response message, such as the QoS response message in line 2 of FIG. 3. In this way, QoS metadata may be defined and communicated between FMP server 106 and client nodes within cluster 108. Further, when only a single metadata parameter is of interest for an application at a client node, such as client node 1 110, a single QoS metadata parameter may be communicated between FMP server 106 and client nodes within cluster 108 as a parameter in either a QoS response message or within an extent and QoS response message. It is understood that all messages described herein may include parameters as described above for identifying regions and QoS metadata and that the parameters are not depicted within the message flow diagrams for simplicity of illustration. Parameters will be described when useful to illustrate an aspect other than those described above.

Figure 6:
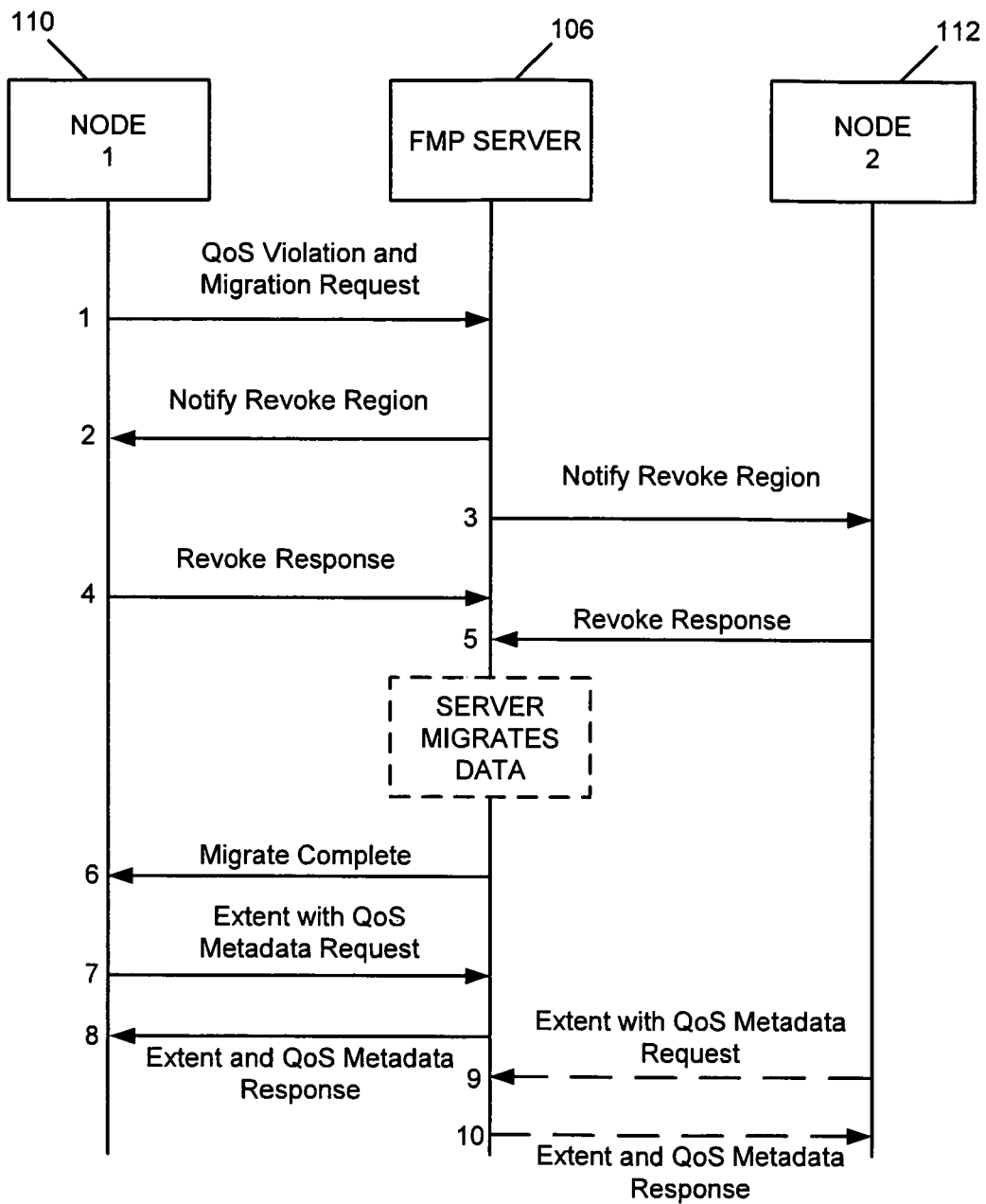
FIG. 6 is a message flow diagram illustrating exemplary messages associated with a QoS violation and migration request wherein a server migrates data associated with a region found to be in violation of QoS metadata performance parameters according to an embodiment of the subject matter described herein.

As described above, a client node may monitor performance of shared storage, compare the monitored performance to QoS metadata, and request migration of data from a region of shared storage associated with a QoS violation. FIG. 6 is a message flow diagram illustrating exemplary messages associated with a QoS violation and migration request where a server migrates data associated with a region found to be in violation of QoS metadata performance parameters. Referring to FIG. 6, in line 1 of the message flow diagram, node 1 110 formulates a QoS violation and migration request message and sends it to FMP server 106. This QoS violation and migration request message may be formulated and sent in response to a detection of a QoS violation by node 1 110.

In response to receiving the QoS violation and migration request of line 1, FMP server 106 formulates a notify revoke region message and sends it to node 1 110 in line 2 of the message flow diagram. Though not depicted in FIG. 6, the QoS violation and migration request message of line 1, the notify revoke region message of line 2, and all other messages illustrated in FIG. 6 may include parameters for identifying a region or extent of a VLU which is already mapped at the associated node as described above. The notify revoke region message of line 2 may be used as both an acknowledgement of the QoS violation and migration request message of line 1 and may be used to inform node 1 110 that access has been revoked to the region identified within the parameters associated with the notify revoke message of line 2 to inform node 1 110 that the region is in the process of being migrated.

For any other nodes with mappings to or QoS metadata associated with the region to be migrated, FMP server 106 may formulate and send notify revoke messages based upon tracking information maintained by FMP server 106 associated with the region to be revoked. Tracking information that may be used to identify client nodes with mappings to or QoS metadata associated with a region may be provided by management application 116, as described above or may be generated when a client node requests either an extent or QoS metadata for a region. FMP server 106 may track information associated with the requesting client nodes in order to allow generation of notify revoke messages for all client nodes with mappings to a region to be revoked and migrated. For purposes of illustration, it will be assumed that only node 2 112 has previously requested a mapping to and/or QoS metadata associated with the region to be migrated.

In line 3 of the message flow diagram, FMP server 106 formulates and sends a notify revoke region message to node 2 112. This message may be assumed to have been generated because node 2 112 has previously requested a mapping to and/or QoS metadata associated with the region that is to be migrated. FMP server 106 may then anticipate responses from client nodes indicating acknowledgement of issued notify revoke messages.

In lines 4 and 5 of the message flow diagram, node 1 110 and node 2 112, respectively, formulate and send revoke response messages to FMP server 106. Node 1 110 and node 2 112 may delete mappings to the extent and any associated QoS metadata prior to formulating and sending the revoke response messages of lines 4 and 5, respectively. FMP server 106 may determine a migration strategy for the data associated with the region either prior to or upon receipt of the anticipated revoke response messages. Accordingly, FMP server 106 may begin a migration process for the data upon receipt of the anticipated revoke response messages.

In response to receiving revoke response messages from the client nodes with mappings to the region, FMP server 106 may implement a migration of the data associated with the region. As will be described in more detail below, FMP server 106 may choose to migrate the data itself, or it may offload the migration activity to one of the client nodes. Because the client nodes have direct access to the physical storage devices within RAID arrays 102 and 104, FMP server 106 may issue a migration request to a client node including source and destination physical storage device access information.

In FIG. 6, FMP server 106 is assumed to have made a determination to migrate the data itself rather than requesting that a client node migrate the data. As can be seen by the dashed box, FMP server 106 may perform a migration action by copying data associated with the source region of a RAID array, such as RAID array 102, associated with the QoS violation to a destination region of a RAID array, which may be the same RAID array or another RAID array, such as RAID array 104. FMP server 106 may identify the destination region based upon information provided by management application 116 associated with the disks that make up RAID array 102 and 104 in order to choose physical disks with quality of service suitable for the migration operation. FMP server 106 may also augment information provided by management application 116 over time based upon QoS violation and migration requests and may build a performance information database associated with the RAID arrays. This database may be stored within an extent of a RAID array, such as RAID array 102 and may be cached in a memory at FMP server 106.

Upon completion of the migration operation, FMP server 106 formulates and sends a migrate complete message to node 1 110 in line 6 of the message flow diagram. The migrate complete message may indicate to the requesting node that the migration that was requested has been completed and may serve as a final acknowledgement of the initial QoS violation and migration request message. Client node 1 110 may then request an extent mapping and QoS metadata for the region and may obtain extent mapping and QoS metadata associated with the physical disks newly associated with the region. A request generated by node 1 110 may be formulated in response to an application-level I/O request or may be formulated in response to receipt of the migrate complete message of line 6. In line 7 of the message flow diagram, node 1 110 formulates and sends an extent with QoS request message associated with the region to FMP server 106. FMP server 106 responds in line 8 by formulating and sending an extent and QoS response message.

Because node 2 112 was not the requesting node, a migrate complete message has not been formulated and sent to node 2 112 by FMP server 106. Alternatively, FMP server 106 may formulate and send a migrate complete message to all nodes that previously had mappings and/or QoS metadata for a region of a VLU using the tracking information described above. In the message flow diagram of FIG. 6, a migrate complete message has not been sent to node 2 112. Node 2 112 may request a new mapping and QoS metadata for the region in response to an application-level I/O request. In line 9 of the message flow diagram, node 2 112 formulates and sends an extent with QoS request message associated with the region to FMP server 106. FMP server 106 responds in line 10 by formulating and sending an extent and QoS response message. The arrows in lines 9 and 10 are illustrated as dashed-lines to indicate that the associated messages may be generated at a later time than the remaining messages in FIG. 6 in response to stimuli other than a migrate complete message.

Figure 7:
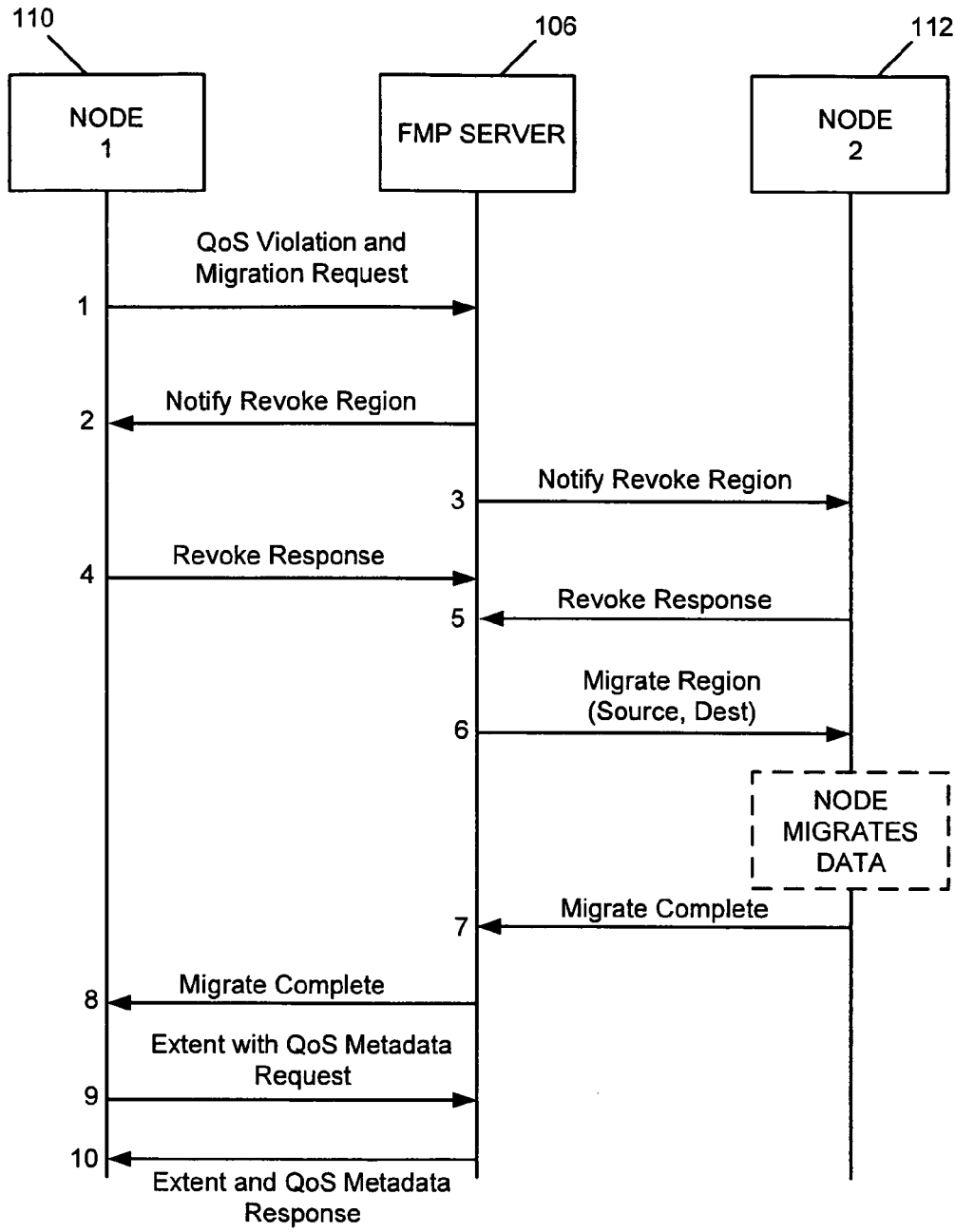
FIG. 7 is a message flow diagram illustrating exemplary messages associated with a QoS violation and migration request where a server requests that a node within the cluster migrate data associated with a region found to be in violation of QoS metadata performance parameters according to an embodiment of the subject matter described herein.

In an alternate implementation, rather than having the server migrate data when a QoS violation is detected, a client node other than the node that requests the migration may perform the migration. FIG. 7 is a message flow diagram illustrating exemplary messages associated with a QoS violation and migration request wherein a server requests that a node other than a requesting node migrate data associated with a region found to be in violation of QoS metadata performance parameters. Referring to FIG. 7, in line 1 of the message flow diagram, node 1 110 formulates a QoS violation and migration request message and sends it to FMP server 106. This QoS violation and migration request message may be formulated and sent in response to a detection of a QoS violation by node 1 110.

In response to receiving the QoS violation and migration request of line 1, FMP server 106 formulates a notify revoke region message and sends it to node 1 110 in line 2 of the message flow diagram. Though not depicted in FIG. 7, the QoS violation and migration request message of line 1, the notify revoke region message of line 2, and all other messages illustrated in FIG. 7 may include parameters for identifying a region or extent of a VLU which is already mapped at the associated node as described above. The notify revoke region message of line 2 may be used as both an acknowledgement of the QoS violation and migration request message of line 1 and may be used to inform node 1 110 that access has been revoked to the region identified within the parameters associated with the notify revoke message of line 2 to inform node 1 110 that the region is going to be migrated.

For any other nodes with mappings to or QoS metadata associated with the region to be migrated, FMP server 106 may formulate and send notify revoke messages based upon tracking information maintained by FMP server 106 associated with the region to be revoked as described above. Tracking information that may be used to identify client nodes with mappings to or QoS metadata associated with a region may be generated when a client node requests either an extent or QoS metadata for a region. FMP server 106 may track information associated with the requesting client node in order to allow generation of notify revoke messages for all client nodes with mappings to a region to be revoked and migrated. For purposes of illustration, it is assumed that only node 2 112 has previously requested a mapping to the region being migrated and/or QoS metadata associated with the region to be migrated.

In line 3 of the message flow diagram, FMP server 106 formulates and sends a notify revoke region message to node 2 112. This message is to have been generated because node 2 112 has previously requested a mapping to and/or QoS metadata associated with the region that is to be migrated. FMP server 106 may then anticipate responses from all nodes indicating acknowledgement of issued notify revoke messages.

In lines 4 and 5 of the message flow diagram, node 1 110 and node 2 112, respectively, formulate and send revoke response messages to FMP server 106. Node 1 110 and node 2 112 may delete mappings to the extent and any associated QoS metadata prior to formulating and sending the revoke response messages of lines 4 and 5, respectively. FMP server 106 may determine a migration strategy for the data associated with the region either prior to or upon receipt of the anticipated revoke response messages. In this way, FMP server 106 may begin a migration process for the data upon receipt of the anticipated revoke response messages.

In response to receiving revoke response messages from the client nodes with mappings to the region, FMP server 106 may effect a migration of the data associated with the region. As described above, FMP server 106 may choose to migrate the data itself, or as will be described in more detail below, it may offload the migration activity to one of the client nodes.

Because the client nodes have direct access to the physical devices within RAID arrays 102 and 104, FMP server 106 may issue a migration request to a client node including source and destination physical device access information.

In FIG. 7, FMP server 106 is assumed to have made a determination to have client node 2 112 migrate the data. It should be noted that, while node 2 112 is assumed to have obtained a mapping and/or QoS metadata for the region to be revoked, it is not necessary for the node chosen to migrate the data to have had a previous mapping to the data. Any node may be chosen to migrate the data associated with the region to be migrated.

In line 6 of the message flow diagram, FMP server 106 formulates and sends a migrate region message to node 2 112 including source and destination extent identifiers associated with the migration request. As described above, the source and destination parameters may include parameters derived from fields 502 through 510 of storage extent identifier data structure 500.

As illustrated by the dashed box in FIG. 7, client node 2 112 may perform a migration action by copying data associated with the source region of a RAID array, such as RAID array 102, associated with the QoS violation to a destination region of a RAID array, which may be the same RAID array or another RAID array, such as RAID array 104. FMP server 106 may identify the destination region based upon information provided by management application 116 associated with the disks that make up RAID array 102 and 104 in order to choose physical disks with a higher quality of service. FMP server 106 may also augment information provided by management application 116 over time based upon QoS violation and migration requests and may build a performance information database associated with the RAID arrays. This database may be stored within an extent of a RAID array, such as RAID array 102.

Upon completion of the migration operation, node 2 112 formulates and sends a migrate complete message in line 7 of the message flow diagram. The migrate complete message may indicate to FMP server 106 that the migration that was requested has been completed. FMP server 106 may then formulate and send a migrate complete message in line 8 of the message flow diagram to inform client node 1 110 that the migration it requested has been completed, thereby notify node 1 110 that it may request a new extent and/or metadata for the region and serving as a final acknowledgement of the QoS violation and migration request of line 1 of the message flow diagram.

Client node 1 110 may then request an extent mapping and QoS metadata for the region and may obtain extent mapping and QoS metadata associated with the physical disks newly associated with the region. A request generated by node 1 110 may be formulated in response to an application-level I/O request or may be formulated in response to receipt of the migrate complete message of line 8. In line 9 of the message flow diagram, node 1 110 formulates and sends an extent with QoS request message associated with the region to FMP server 106. FMP server 106 responds in line 10 by formulating and sending an extent and QoS response message.

Because node 2 112 was not the requesting node, a migrate complete message has not been formulated and sent to node 2 112 by FMP server 106. Alternatively, FMP server 106 may formulate and send a migrate complete message to all nodes that previously had mappings and/or QoS metadata for a region of a VLU using the tracking information described above. In the message flow diagram of FIG. 7, a migrate complete message has not been sent to node 2 112. Node 2 112 may request a new mapping and QoS metadata for the region in response to an application-level I/O request. Messaging associated with a request from node 2 112 have not been depicted in FIG. 7.

Figure 8:
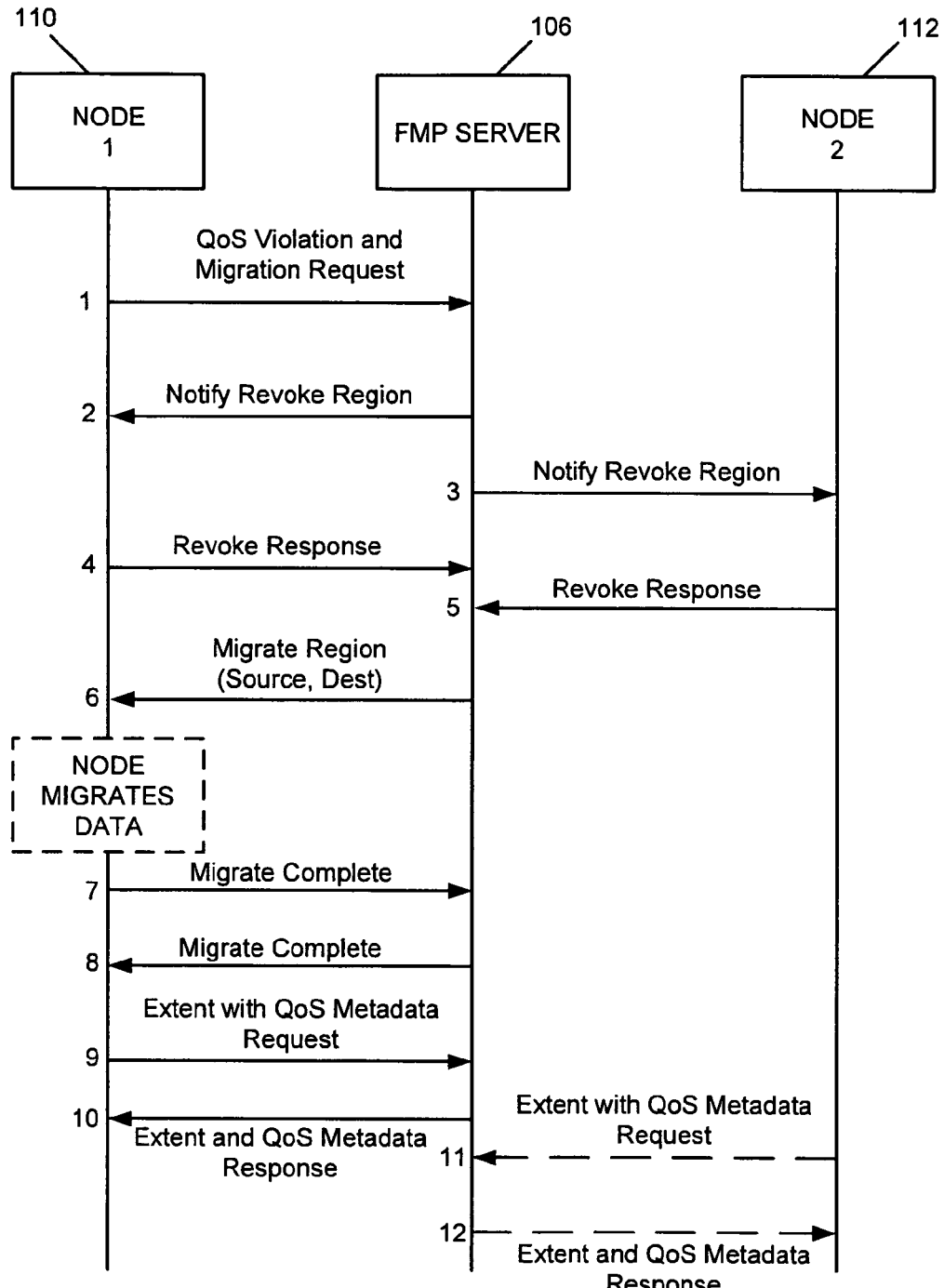
FIG. 8 is a message flow diagram illustrating exemplary messages associated with a QoS violation and migration request where a server requests that the requesting node within the cluster migrate data associated with a region found to be in violation of QoS metadata performance parameters according to an embodiment of the subject matter described herein.

In yet another alternate implementation of the subject matter described herein, a client node that requests migration of data in response to detection of a QoS violation may perform the migration. FIG. 8 is a message flow diagram illustrating exemplary messages associated with a QoS violation and migration request where a server requests that the requesting node within the cluster migrate data associated with a region found to be in violation of QoS metadata performance parameters. Referring to FIG. 8, in line 1 of the message flow diagram, node 1 110 formulates a QoS violation and migration request message and sends it to FMP server 106. This QoS violation and migration request message may be formulated and sent in response to a detection of a QoS violation by node 1 110.

In response to receiving the QoS violation and migration request of line 1, FMP server 106 formulates a notify revoke region message and sends it to node 1 110 in line 2 of the message flow diagram. Though not depicted in FIG. 8, both the QoS violation and migration request message of line 1, the notify revoke region message of line 2, and all other messages illustrated in FIG. 8 may include parameters for identifying a region or extent of a VLU which is already mapped at the associated node as described above. The notify revoke region message of line 2 may be used as both an acknowledgement of the QoS violation and migration request message of line 1 and may be used to inform node 1 110 that access has been revoked to the region identified within the parameters associated with the notify revoke message of line 2 to inform node 1 110 that the region is going to be migrated.

For any other nodes with mappings to or QoS metadata associated with the region to be migrated, FMP server 106 may formulate and send notify revoke messages based upon tracking information maintained by FMP server 106 associated with the region to be revoked as described above. Tracking information that may be used to identify client nodes with mappings to or QoS metadata associated with a region may be generated when a client node requests either an extent or QoS metadata for a region. FMP server 106 may track information associated with the requesting client node in order to allow generation of notify revoke messages for all client nodes with mappings to a region to be revoked and migrated. For purposes of illustration, it will be assumed that only node 2 112 has previously requested a mapping to and/or QoS metadata associated with the region to be migrated.

In line 3 of the message flow diagram, FMP server 106 formulates and sends a notify revoke region message to node 2 112. This message is assumed to have been generated because node 2 112 has previously requested a mapping to and/or QoS metadata associated with the region that is to be migrated. FMP server 106 may then anticipate responses from all nodes indicating acknowledgement of issued notify revoke messages.

In lines 4 and 5 of the message flow diagram, node 1 110 and node 2 112, respectively, formulate and send revoke response messages to FMP server 106. Node 1 110 and node 2 112 may delete mappings to the extent and any associated QoS metadata prior to formulating and sending the revoke response messages of lines 4 and 5, respectively. FMP server 106 may determine a migration strategy for the data associated with the region either prior to or upon receipt of the anticipated revoke response messages. In this way, FMP server 106 may begin a migration process for the data upon receipt of the anticipated revoke response messages.

In response to receiving revoke response messages from the client nodes with mappings to the region, FMP server 106 may implement a migration of the data associated with the region. As described above, FMP server 106 may choose to migrate the data itself, or described above and in more detail below, it may offload the migration activity to one of the client nodes. Because the client nodes have direct access to the physical devices within RAID arrays 102 and 104, FMP server 106 may issue a migration request to a client node including source and destination physical device access information.

In FIG. 8, FMP server 106 is assumed to have made a determination to have client node 1 110, the requesting node that detected the QoS violation, migrate the data. It should be noted that, while node 1 110 is assumed to have detected the QoS violation based upon it having obtained a mapping and/or QoS metadata for the region and having monitored the performance of the region to be revoked, it is not necessary for the node chosen to migrate the data to have had a previous mapping to the data. Any node may be chosen to migrate the data associated with the region to be migrated.

In line 6 of the message flow diagram, FMP server 106 formulates and sends a migrate region message to node 1 110 including source and destination extent identifiers associated with the migration request. As described above, the source and destination parameters may include parameters derived from fields 502 through 510 of storage extent identifier data structure 500.

As illustrated by the dashed box in FIG. 8, client node 1 110 may perform a migration action by copying data associated with the source region of a RAID array, such as RAID array 102, associated with the QoS violation to a destination region of a RAID array, which may be the same RAID array or another RAID array, such as RAID array 104. FMP server 106 may identify the destination region based upon information provided by management application 116 associated with the disks that make up RAID array 102 and 104 in order to choose physical disks with a higher quality of service. FMP server 106 may also augment information provided by management application 116 over time based upon QoS violation and migration requests and may build a performance information database associated with the RAID arrays. This database may be stored within an extent of a RAID array, such as RAID array 102.

Upon completion of the migration operation, node 1 110 formulates and sends a migrate complete message in line 7 of the message flow diagram. The migrate complete message may indicate to FMP server 106 that the migration that was requested has been completed. FMP server 106 may then formulate and send a migrate complete message in line 8 of the message flow diagram to inform client node 1 110 that the migration it requested has been completed, thereby notify node 1 110 that it may request a new extent and/or metadata for the region and serving as a final acknowledgement of the QoS violation and migration request of line 1 of the message flow diagram. An enhancement of this messaging sequence will be described in a separate message flow diagram below where QoS metadata may be communicated to a client node as a parameter associated with the migrate region message, thereby eliminating the need for separate message in order to obtain QoS metadata for the physical disks associated with the destination of the migration operation.

Once the migration is complete, client node 1 110 may request an extent mapping and QoS metadata for the migrated-to region and may obtain extent mapping and QoS metadata associated with the physical disks associated with the region. A request generated by node 1 110 may be formulated in response to an application-level I/O request or may be formulated in response to receipt of the migrate complete message of line 8. In line 9 of the message flow diagram, node 1 110 formulates and sends an extent with QoS request message associated with the region to FMP server 106. FMP server 106 responds in line 10 by formulating and sending an extent and QoS response message.

Because node 2 112 was not the requesting node, a migrate complete message has not been formulated and sent to node 2 112 by FMP server 106. Alternatively, FMP server 106 may formulate and send a migrate complete message to all nodes that previously had mappings and/or QoS metadata for a region of a VLU using the tracking information described above. In the message flow diagram of FIG. 8, a migrate complete message has not been sent to node 2 112. Node 2 112 may request a new mapping and QoS metadata for the region in response to an application-level I/O request. In line 11 of the message flow diagram, node 2 112 has formulated and sent an extent with QoS request message associated with the region to FMP server 106. FMP server 106 responds in line 12 by formulating and sending an extent and QoS response message. The arrows in lines 11 and 12 are shown as dashed lines to indicate that the associated messages may be generated at a later time than the remaining messages in FIG. 8 in response to stimuli other than a migrate complete message.

Figure 9:
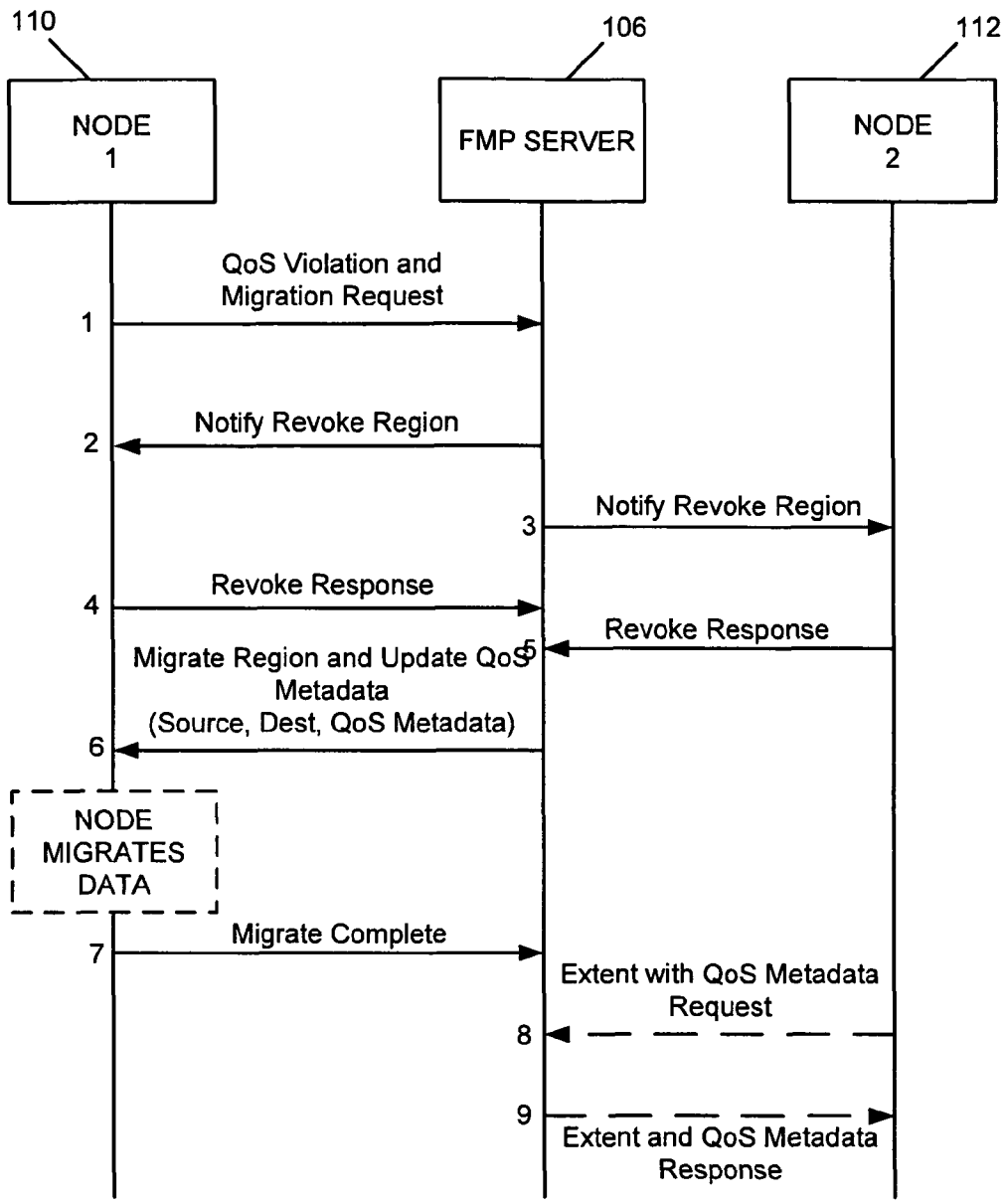
FIG. 9 is a message flow diagram illustrating exemplary messages associated with a QoS violation and migration request where a server requests that the requesting node within the cluster migrate data associated with a region found to be in violation of QoS metadata performance parameters and wherein QoS metadata associated with the destination physical disks is communicated as part of the migration request according to an embodiment of the subject matter described herein.

In yet another implementation of the subject matter described herein, QoS metadata associated with a migrated-to region may be communicated to a node that performs the migration using the same message that directs the node to perform the migration. FIG. 9 is a message flow diagram illustrating exemplary messages associated with a QoS violation and migration request where a server requests that the requesting node within the cluster migrate data associated with a region found to be in violation of QoS metadata performance parameters and wherein QoS metadata associated with the destination physical disks is communicated as part of the migration request. This enhancement may be utilized as part of a migration request message to any client node with an existing mapping to the region associated with the QoS violation and migration request from the server. Referring to FIG. 9, in line 1 of the message flow diagram, node 1 110 formulates a QoS violation and migration request message and sends it to FMP server 106. This QoS violation and migration request message may be formulated and sent in response to a detection of a QoS violation by node 1 110.

In response to receiving the QoS violation and migration request of line 1, FMP server 106 formulates a notify revoke region message and sends it to node 1 110 in line 2 of the message flow diagram. Though not depicted in FIG. 9, the QoS violation and migration request message of line 1, the notify revoke region message of line 2, and all other messages illustrated in FIG. 9 may include parameters for identifying a region or extent of a VLU which is already mapped at the associated node as described above. The notify revoke region message of line 2 may be used as both an acknowledgement of the QoS violation and migration request message of line 1 and may be used to inform node 1 110 that access has been revoked to the region identified within the parameters associated with the notify revoke message of line 2 to inform node 1 110 that the region is going to be migrated.

For any other nodes with mappings to or QoS metadata associated with the region to be migrated, FMP server 106 may formulate and send notify revoke messages based upon tracking information maintained by FMP server 106 associated with the region to be revoked as described above. Tracking information that may be used to identify client nodes with mappings to or QoS metadata associated with a region may be generated when a client node requests either an extent or QoS metadata for a region. FMP server 106 may track information associated with the requesting client node in order to allow generation of notify revoke messages for all client nodes with mappings to a region to be revoked and migrated. For purposes of illustration, it is assumed that only node 2 112 has previously requested a mapping to and/or QoS metadata associated with the region to be migrated.

In line 3 of the message flow diagram, FMP server 106 formulates and sends a notify revoke region message to node 2 112. This message is assumed to have been generated because node 2 112 has previously requested a mapping to and/or QoS metadata associated with the region that is to be migrated. FMP server 106 may then anticipate responses from all nodes indicating acknowledgement of issued notify revoke messages.

In lines 4 and 5 of the message flow diagram, node 1 110 and node 2 112, respectively, formulate and send revoke response messages to FMP server 106. Node 1 110 and node 2 112 may delete mappings to the extent and any associated QoS metadata prior to formulating and sending the revoke response messages of lines 4 and 5, respectively. FMP server 106 may determine a migration strategy for the data associated with the region either prior to or upon receipt of the anticipated revoke response messages. In this way, FMP server 106 may begin a migration process for the data upon receipt of the anticipated revoke response messages.

In response to receiving revoke response messages from the client nodes with mappings to the region, FMP server 106 may implement a migration of the data associated with the region. As described above, FMP server 106 may choose to migrate the data itself, or as described above and in more detail below, it may offload the migration activity to one of the client nodes. Because the client nodes have direct access to the physical devices within RAID arrays 102 and 104, FMP server 106 may issue a migration request to a client node including source and destination physical device access information.

In FIG. 9, FMP server 106 is assumed to have made a determination to have client node 1 110, the requesting node that detected the QoS violation, migrate the data. It should be noted that while node 1 110 is assumed to have detected the QoS violation based upon it having obtained a mapping and/or QoS metadata for the region and having monitored the performance of the region to be revoked, it is not necessary for the node chosen to migrate the data to have had a previous mapping to the data. Any node may be chosen to migrate the data associated with the region to be migrated.

In line 6 of the message flow diagram, FMP server 106 formulates and sends a migrate region and update QoS message to node 1 110 including source and destination extent identifiers associated with the migration request as described above. As described above, the source and destination parameters may include parameters derived from fields 502 through 510 of storage extent identifier data structure 500.

Additionally, the migrate region and update QoS message includes QoS metadata associated with the physical disks that make up the destination for the migrate operation. The QoS metadata may include parameters derived from fields 512 through 522 of storage extent identifier data structure 500. By passing QoS metadata associated with the destination physical disks, the messaging sequence associated with a migration request issued to a client node may be enhanced. The client node may store the new destination extent and QoS metadata upon receipt of the migrate region and update QoS message or upon completion of the migration operation.

As can be seen by the dashed box, client node 1 110 may perform a migration action by copying data associated with the source region of a RAID array, such as RAID array 102, associated with the QoS violation to a destination region of a RAID array, which may be the same RAID array or another RAID array, such as RAID array 104. FMP server 106 may identify the destination region based upon information provided by management application 116 associated with the disks that make up RAID array 102 and 104 in order to choose physical disks with a higher quality of service. FMP server 106 may also augment information provided by management application 116 over time based upon QoS violation and migration requests and may build a performance information database associated with the RAID arrays. This database may be stored within an extent of a RAID array, such as RAID array 102.

Upon completion of the migration operation, node 1 110 formulates and sends a migrate complete message in line 7 of the message flow diagram. The migrate complete message may indicate to FMP server 106 that the migration that was requested has been completed. In this embodiment, an additional migrate complete message does not need to be issued by FMP server 106 to client node 1 110 because node 1 110 already knows that it is terminating the messaging sequence for the migration operation by the use of the migrate region and update QoS message which included the QoS metadata for the destination physical disks.

Optionally, FMP server 106 may issue a migrate complete acknowledgement message and send it to node 1 110 in response to the migrate complete message of line 7 to notify node 1 110 that FMP server 106 has received notification of the completed migration. As well, any of the other embodiments described above may also include acknowledgement messages associated with the migrate complete messages described therein without departure from the subject matter therein described.

Because node 2 112 was not the requesting node, a migrate complete message has not been formulated and sent to node 2 112 by FMP server 106. Alternatively, FMP server 106 may formulate and send a migrate complete message to all nodes that previously had mappings and/or QoS metadata for a region of a VLU using the tracking information described above. In the message flow diagram of FIG. 9, a migrate complete message has not been sent to node 2 112. Node 2 112 may request a new mapping and QoS metadata for the region in response to an application-level I/O request. In line 8 of the message flow diagram, node 2 112 has formulated and sent an extent with QoS request message associated with the region to FMP server 106. FMP server 106 responds in line 9 by formulating and sending an extent and QoS response message. The arrows in lines 8 and 9 of FIG. 9 are illustrated as dashed-lines to indicate that the associated messages may be generated at a later time than the remaining messages in FIG. 9 in response to stimuli other than a migrate complete message.

Figure 10A:
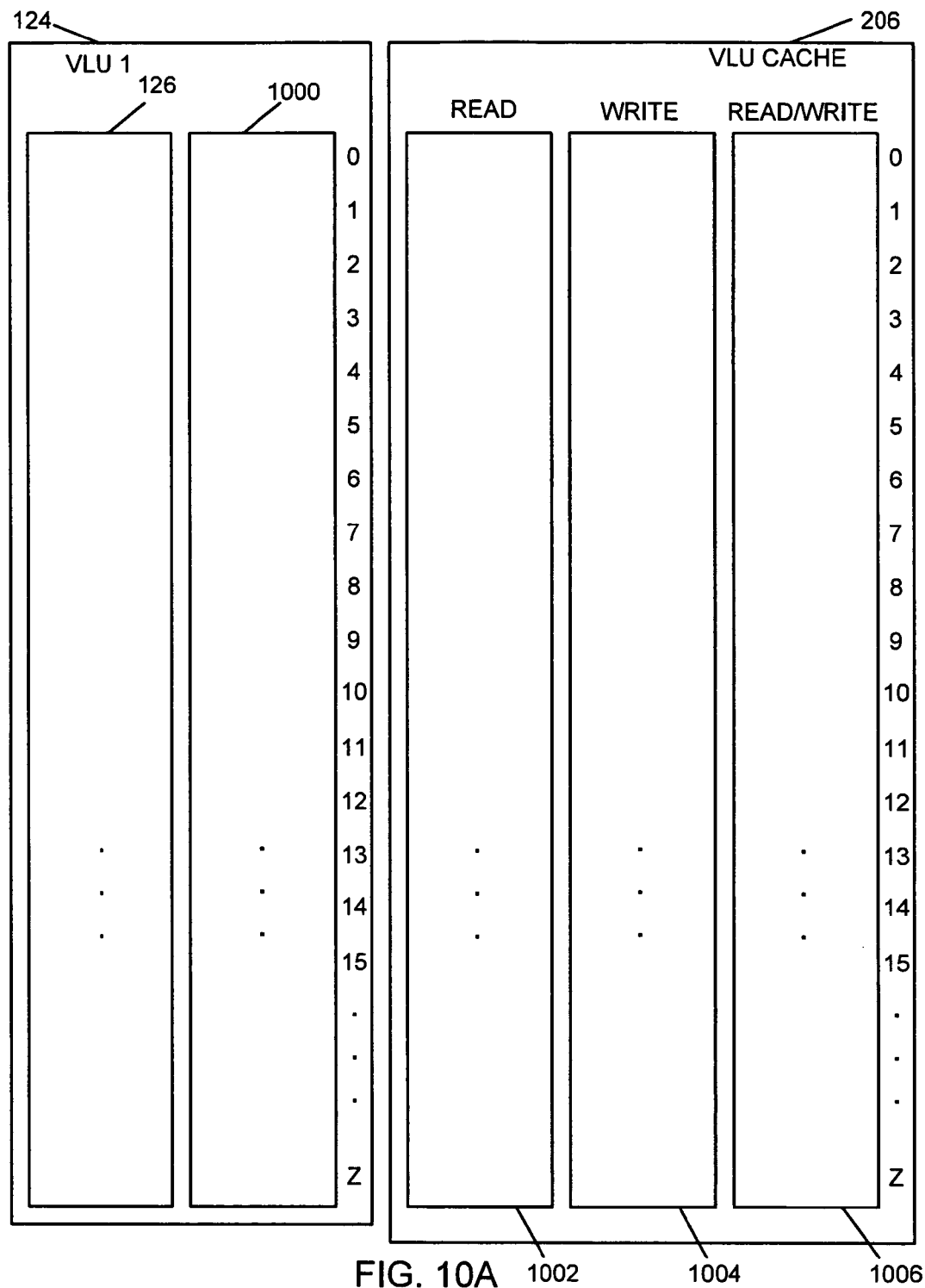
FIG. 10A illustrates an initial state of storage extent maps for a sequential interaction between a client node and a server without any extent mappings shown according to an embodiment of the subject matter described herein.

FIGS. 10A-10D illustrate exemplary storage extent map modifications for a sequential interaction between node 1 110 and FMP server 106 for a situation involving allocated regions within an FMP map of a VLU. FIG. 10A illustrates an initial state for system 100 without any extent mappings shown. For simplicity, FIGS. 10A-10D illustrate VLU and VLU cache mappings that may be used by FMP server 106 and node 1 110 and omit remaining portions of system 100. In FIG. 10A, VLU 1 124 is shown to include FMP map 126 indexed from 0 to Z. Write operations within system 100 may result in provisional allocations of storage extents. Accordingly, a provisional FMP map 1000 is provided within VLU 1

124 to track provisional allocations of storage extents. When a client node requests an allocation of a writeable extent, FMP server 106 may provisionally allocate that extent within provisional FMP map 1000 and may promote the allocation to FMP map 126 upon completion of a commit operation issued by the client node to inform FMP server 106 that the client node would like to have the allocation moved from provisional FMP map 1000 to FMP map 126.

VLU cache 206 is shown to include a read map 1002, a write map 1004, and a read/write map 1006. Each logical map within VLU cache 206 is indexed from 0 to Z to logically represent equivalent logical address regions associated with FMP map 126 within VLU 1 124.

Figure 10B:
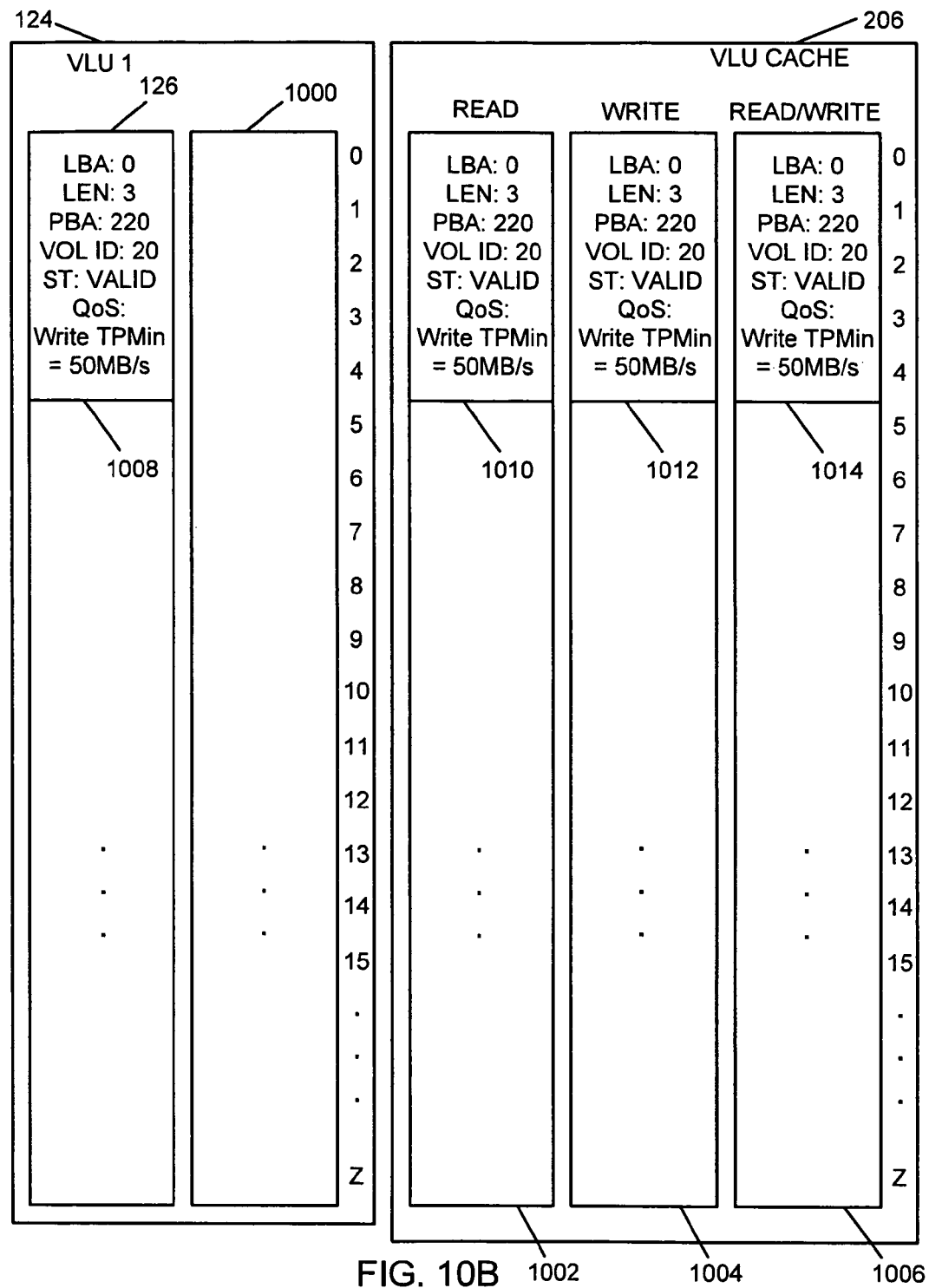
FIG. 10B illustrates an allocated and committed region that is writeable and that has already been committed to a storage extent map according to an embodiment of the subject matter described herein.

FIG. 10B illustrates an allocated and committed region that is writeable and that has already been committed to FMP map 126. Allocated regions of VLU 1 124 have been illustrated within FIG. 10B to include a storage extent identifier 1008 within FMP map 126. Storage extent identifier 1008 has a logical block address of 0, a length of 3, a physical block address of 220, a volume identifier of 20, and a state of valid. Storage extent identifier 1008 includes one QoS metadata parameter indicating that the region has a minimum write throughput (TP) of 50 megabytes (MB) per second. The state of the storage extent identifier 1008 is set to valid to indicate that the region is assumed to have been previously committed to FMP map 126. Accordingly, no provisional allocation is shown within provisional FMP map 1000.

Three other storage extent identifiers are shown within FIG. 10B. A storage extent identifier 1010 within read map 1002, a storage extent identifier 1012 within write map 1004, and a storage extent identifier 1014 within read/write map 1006 each map to the same physical disk space associated with storage extent identifier 1008. It is assumed for purposes of illustration that storage extent identifiers 1010, 1012, and 1014 were created in response to an application-level I/O request that was processed by client node 1 110 and that resulted in the valid and committed storage extent identifier 1008 within FMP map 126 described above. Accordingly, client node 1 110 has a readable, writeable, and a read/write mapping defined for the region.

With mappings for a region defined with associated QoS metadata, node 1 110 may begin monitoring the I/O performance of the physical disks associated with the region. Monitoring I/O performance may include measuring and recording parameters associated with I/O operations requested by node 1 110. For example, node 1 110 may measure throughput associated with read or write operations involving a portion of a disk array. In another example, node 1 110 may determine the security level provided by a portion of a disk array. Node 1 110 may compare the actual I/O performance for a data storage extent with the QoS metadata defined for the extent and may thereby determine when a violation exists for the extent. In response to determining that a QoS violation exists for a storage extent, node 1 110 may alert FMP server 106 and may request that the data be migrated by issuing a QoS violation and migration request to FMP server 106, as described above.

For purposes of illustration, it is assumed that node 1 110 determined that a QoS violation occurred with respect to the QoS metadata defined for the region associated with storage extent identifier 1008 and that a messaging sequence as described above was initiated by node 1 110.

Figure 10C:
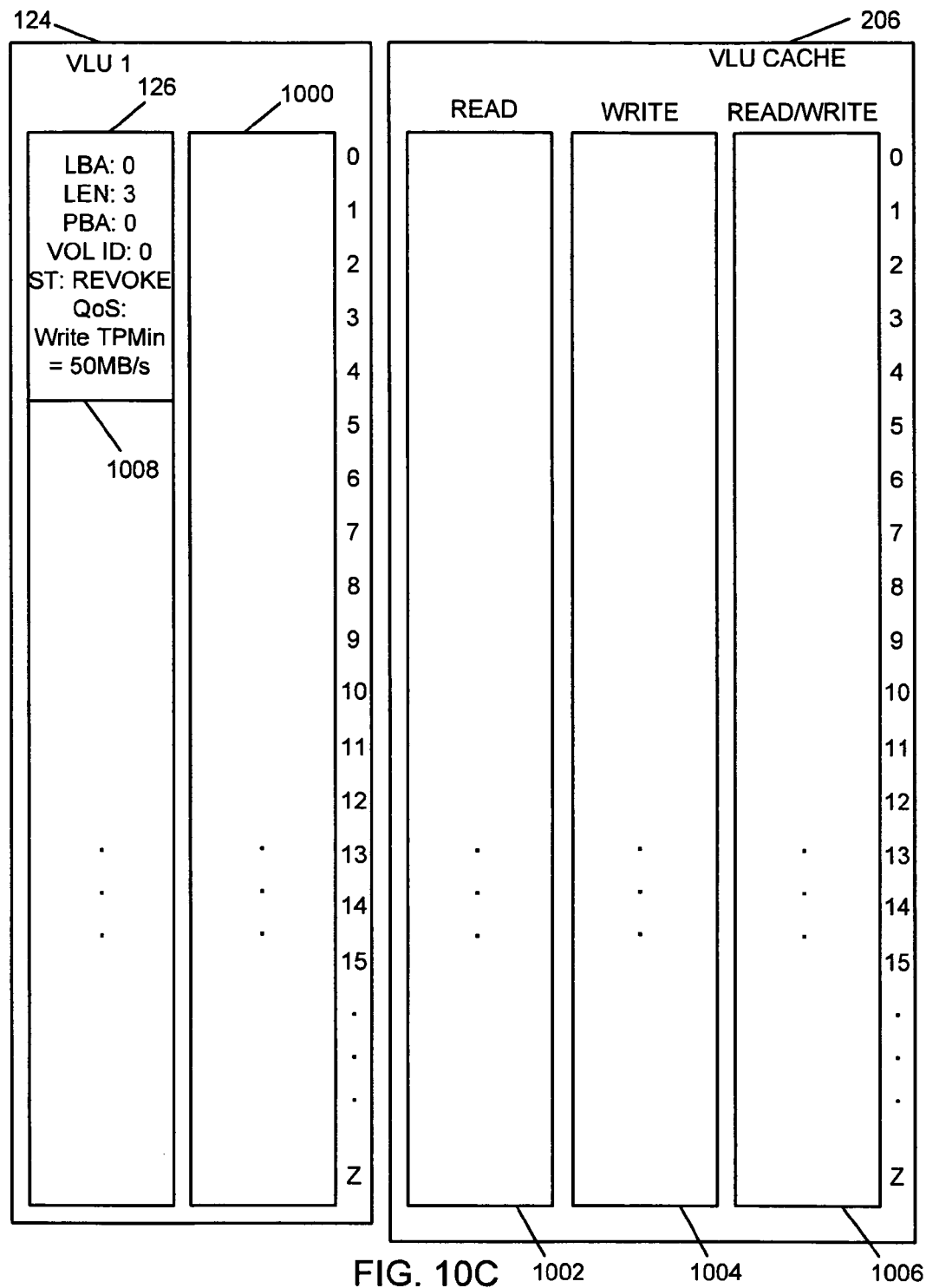
FIG. 10C illustrates the state of storage extent maps system after a revoke response message has been issued according to an embodiment of the subject matter described herein.

FIG. 10C illustrates the state of system 100 after a revoke response message in line 4 of any of FIGS. 6 through 9 has been issued. As can be seen in FIG. 10C, storage extent identifiers 1010, 1012, and 1014 have been deleted from read map 1002, write map 1004, and read/write map 1006, respectively. The state of storage extent identifier 1008 has been changed to "revoke" to indicate that a migration is in process.

Figure 10D:
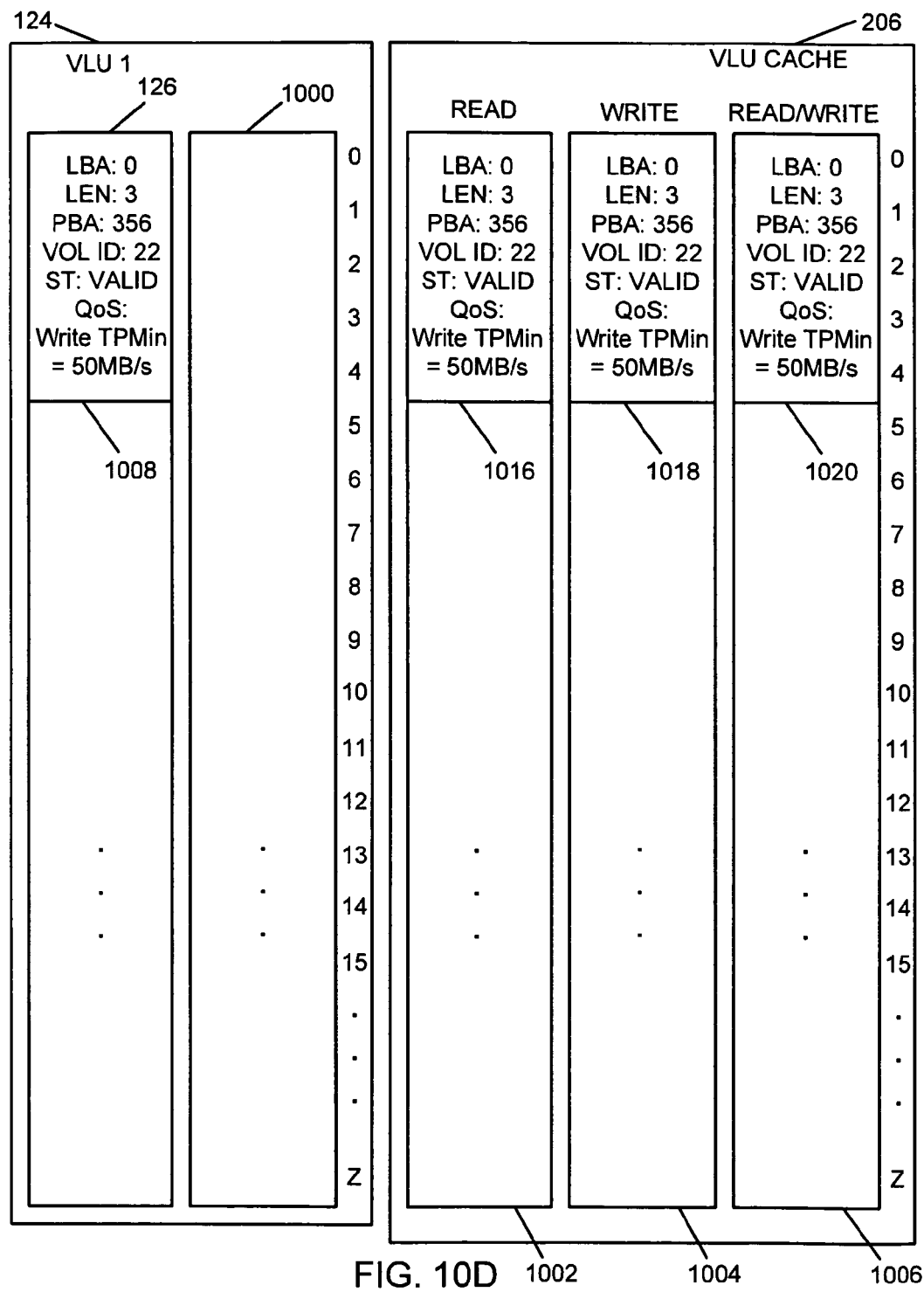
FIG. 10D illustrates the state of storage extent maps after data migration has been completed and after new extent mappings and QoS metadata have been provided to the client node according to an embodiment of the subject matter described herein.

FIG. 10D illustrates the state of system 100 after data migration has been completed and after new extent mappings and QoS metadata have been provided to node 1 110 by any of the messaging approaches described above in FIGS. 6 through 9. As can be seen from FIG. 10D, the contents of storage extent identifier 1008 map to new physical disk space. Storage extent identifier 1008 now has a logical block address of 0, a length of 3, a physical block address of 356, a volume identifier of 22, and a state of valid. Storage extent identifier 1008 includes one QoS metadata parameter indicating that the region has a minimum write throughput (TP) of 50 megabytes (MB) per second, which coincides with the previous QoS metadata associated with the region. The state of the storage extent identifier 1008 is set to valid to indicate that the region is assumed to have been previously committed to FMP map 126. Accordingly, no provisional allocation is shown within provisional FMP map 1000.

In FIG. 10D, three new storage extent identifiers have been created within VLU cache 206 to represent the new physical storage associated with the region of VLU 1 124. A storage extent identifier 1016 within read map 1002, a storage extent identifier 1018 within write map 1004, and a storage extent identifier 1020 within read/write map 1006 each map to the same physical disk space associated with storage extent identifier 1008.

With new mappings for the region defined with associated QoS metadata, node 1 110 may again begin monitoring the I/O performance of the physical disks associated with the region. Node 1 110 may compare the actual I/O performance for the extent with the QoS metadata defined for the extent and may thereby determine when a violation exists for the extent. In response to determining that a QoS violation exists for a storage extent, node 1 110 may alert FMP server 106 and may request that the data be migrated by issuing a QoS violation and migration request to FMP server 106, as described above.

Figure 11:
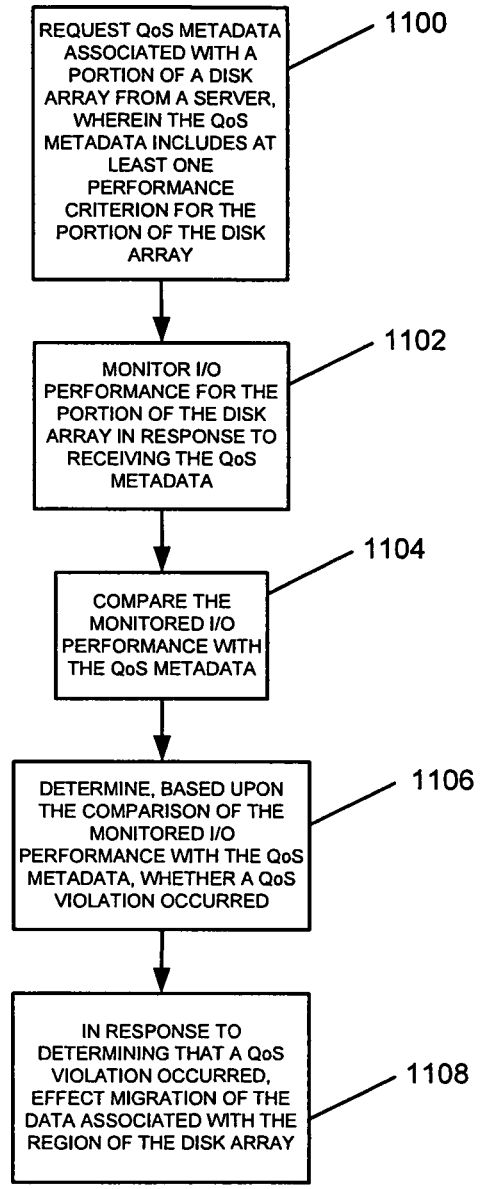
FIG. 11 is a flow chart illustrating a client-side process for managing quality of service for shared storage accessed by a plurality of nodes sharing access to a disk array according to an embodiment of the subject matter described herein.

FIG. 11 is a flow chart illustrating a client-side process for managing quality of service for shared storage accessed by a plurality of nodes sharing access to a disk array. At block 1100, the client may request first QoS metadata associated with a first portion of the first disk array from a server, wherein the first QoS metadata includes at least one performance criterion for the first portion of the first disk array. For example, node 1 110 may request QoS metadata associated with a portion of the RAID array 102 from FMP server 106, such as the QoS metadata of 50 MB per second as a minimum write throughput quality of service associated with storage extent identifier 1014 in FIG. 10B.

At block 1102, the client may monitor I/O performance for the first portion of the first disk array in response to receiving the first QoS metadata. At block 1104, the process may compare the monitored I/O performance with the first QoS metadata. At block 1106, the client may determine, based upon the comparison of the monitored I/O performance with the first QoS metadata, whether a QoS violation has occurred. At block 1108, the client may, in response to determining that a QoS violation has occurred, effect migration of data associated with the first portion of the first disk array. For example, node 1 110 may monitor the I/O performance of the physical disks associated with the storage extent defined within storage extent identifier 1014 within FIG. 10B and may compare the monitored performance with the QoS metadata parameter of 50 MB per second for minimum write throughput. If a QoS violation is determined to exist based upon the comparison, node 1 110 may request that FMP server 106 migrate the data associated with the logical region of the disk array by sending a QoS violation and migration request as in line 1 of FIGS. 6 through 9.

Figure 12:
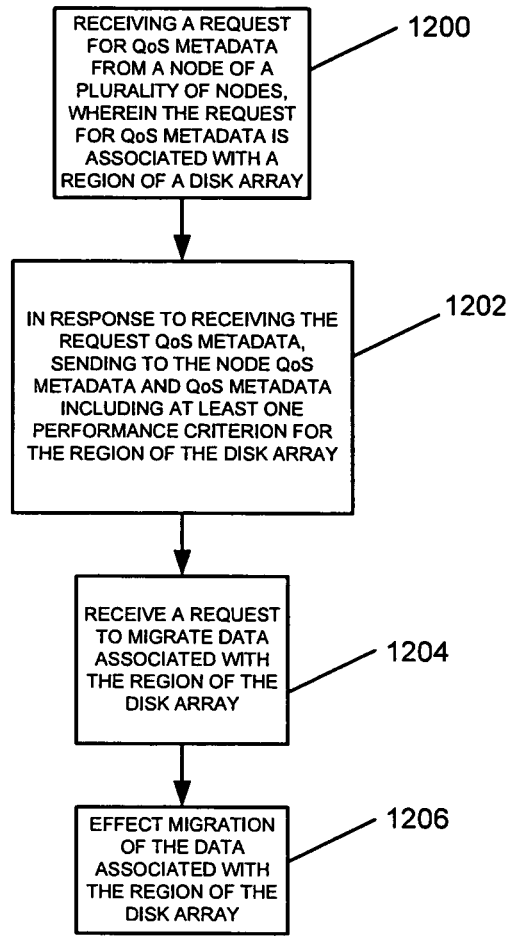
FIG. 12 is a flow chart illustrating a server-side process for managing quality of service for shared storage accessed by a plurality of nodes sharing access to a disk array according to an embodiment of the subject matter described herein.

FIG. 12 is a flow chart illustrating a server-side process for managing quality of service for shared storage accessed by a plurality of nodes sharing access to a disk array. At block 1200, the server receives a request for quality-of-service (QoS) metadata from a node of the plurality of nodes. The request for QoS metadata is associated with a region of a disk array. At block 1202, the server may send to the node QoS metadata including at least one performance criterion for the region of the first disk array in response to receiving the request for QoS metadata. For example, node 1 110 may request QoS metadata and storage extent metadata from FMP server 106 and may store the metadata as any of storage extent identifiers 1010, 1012, and 1014 of FIG. 10B.

At block 1204, the server receives a request from the node to migrate data associated with the region of the first disk array. At block 1206, the server may effect migration of the data associated with the region of the first disk array. For example, FMP server 106 may receive a QoS violation and migration request message from node 1 110 and the FMP server 106 may migrate the data associated with the logical region of the disk array, such as RAID array 102, to another disk array, such as RAID array 104, or to another location with RAID array 102.

Figure 13:
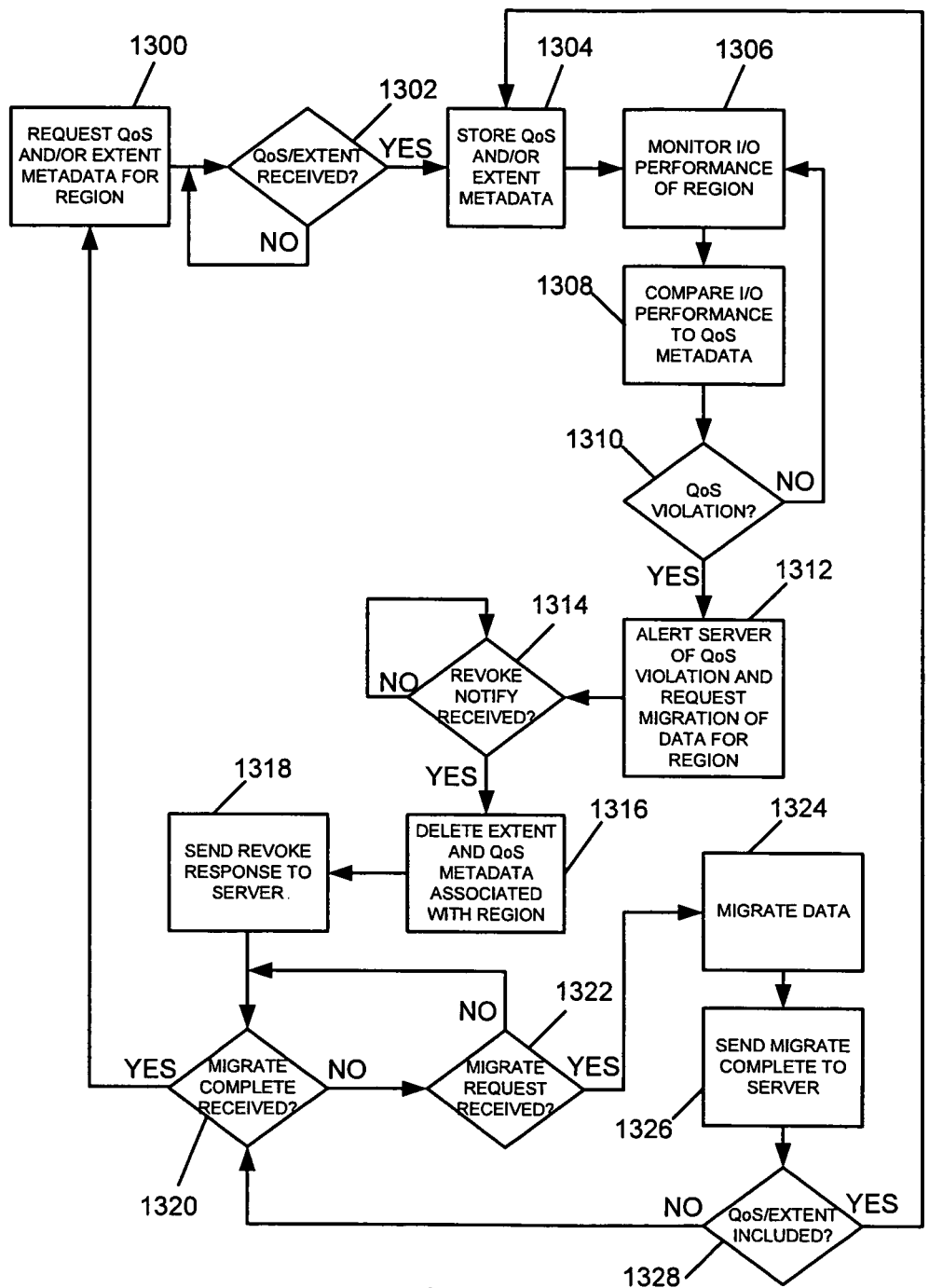
FIG. 13 is a flow chart illustrating a client-side process for managing quality of service for shared storage accessed by a plurality of nodes sharing access to a disk array where a client node migrates data associated with a QoS violation according to an embodiment of the subject matter described herein.

FIG. 13 is a flow chart illustrating a client-side process for managing quality of service for shared storage accessed by a plurality of nodes sharing access to a disk array where a client node may migrate data associated with a QoS violation. At block 1300, the client may request QoS metadata and/or a storage extent metadata for a logical region of a disk array, such as a logical region of VLU 1 124 mapped to a region of RAID array 102. As described above, a client node, such as node 1 110, may request a storage extent metadata with QoS metadata or may request QoS metadata for a storage extent that is already mapped at the client node. At decision point 1302, the client may wait for QoS metadata and/or a storage extent metadata to be received.

Upon receipt of QoS metadata and/or a storage extent metadata, the client may store the QoS metadata and/or the storage extent metadata at block 1304. Metadata may be stored in a VLU cache, such as VLU cache 206 at node 1 110. At block 1306, the client may monitor I/O performance for the region of the disk array as application-level I/O operations are performed by the client node.

At block 1308, the client may compare the monitored I/O performance with the QoS metadata for the region of the disk array. At decision point 1310, the client may make a determination as to whether a QoS violation has occurred with respect to the region based upon the comparison of the monitored I/O performance with the QoS metadata for the region. When no QoS violation has been identified, the client may iteratively monitor I/O performance and compare the monitored I/O performance with the QoS metadata for the region. Though not illustrated in FIG. 13, additional QoS metadata and/or storage extent metadata may be requested for other regions of the disk array and these regions may be monitored concurrently without departure from the scope of the subject matter described herein.

Upon a determination at decision point 1310 that a QoS violation has occurred, the client may alert a server of the QoS violation and request migration of data for the region of disk array at block 1312. For example, a QoS violation and migration request may be issued by a node, such as node 1 110 to FMP server 106 in order to alert FMP server 106 of the QoS violation and request migration of data for the region of disk array.

At decision point 1314, the client may wait for a revoke notify message to be received. For example, node 1 110 may wait for a notify revoke region message to be received from FMP server 106. Upon receipt of a revoke notify message, the client may delete extent and QoS metadata associated with the region of the disk array at block 1316. At block 1318, the process may send a revoke response to the server. For example, node 1 110 may formulate and send a revoke response message to FMP server 106.

At decision points 1320, the client may make a determination as to whether a migrate complete message has been received. If a migrate complete message has been received, the client may return to block 1300 to request new QoS metadata and/or storage extent metadata for the logical region of a disk array and may store the received metadata and begin monitoring I/O performance for the new region in a manner consistent with that described above.

If a migrate complete message is not received, the client may determine whether a migrate request message has been received at decision point 1322. If a migrate request message has not been received, the client may iteratively check for migrate complete message reception at decision point 1320 and migrate request message reception at decision point 1322 until one of the message types is received. Error handling will not be described herein, but any appropriate error handling procedures may be employed to handle a situation where one of the expected message types is not received.

If a migrate request message is received at decision point 1322, the client may migrate the data associated with the logical region of the disk array using source and destination parameters included with the migrate request message at block 1324. The client may send a migrate complete message at block 1326 upon completion of the data migration.

It should be noted that either a migrate region message as described in relation to FIGS. 7 and 8 or a migrate region and update QoS message as described in relation to FIG. 9 may be received at decision point 1322. Accordingly, the client may make a determination at decision point 1328 as to whether QoS metadata was included in the migrate request received at decision point 1322.

When QoS metadata was not included in the received migrate request message, the client may return to decision point 1320 and iterate between decision points 1320 and 1322 until a migrate complete message is received. When a migrate complete message is received, the client may return to block 1300 to begin the QoS metadata and/or storage extent metadata request, store and monitor sequence described above. When QoS metadata was included in the received migrate request message, the client may return to block 1304 to store the metadata and may again begin monitoring I/O performance at block 1306.

Accordingly, the process illustrated in FIG. 13 may be used by a client node, such as node 1 110, to request QoS metadata and/or storage extent metadata from a server, such as FMP server 106. Received QoS metadata may then be used to monitor I/O in a distributed fashion without further interaction with the server.

Figure 14:
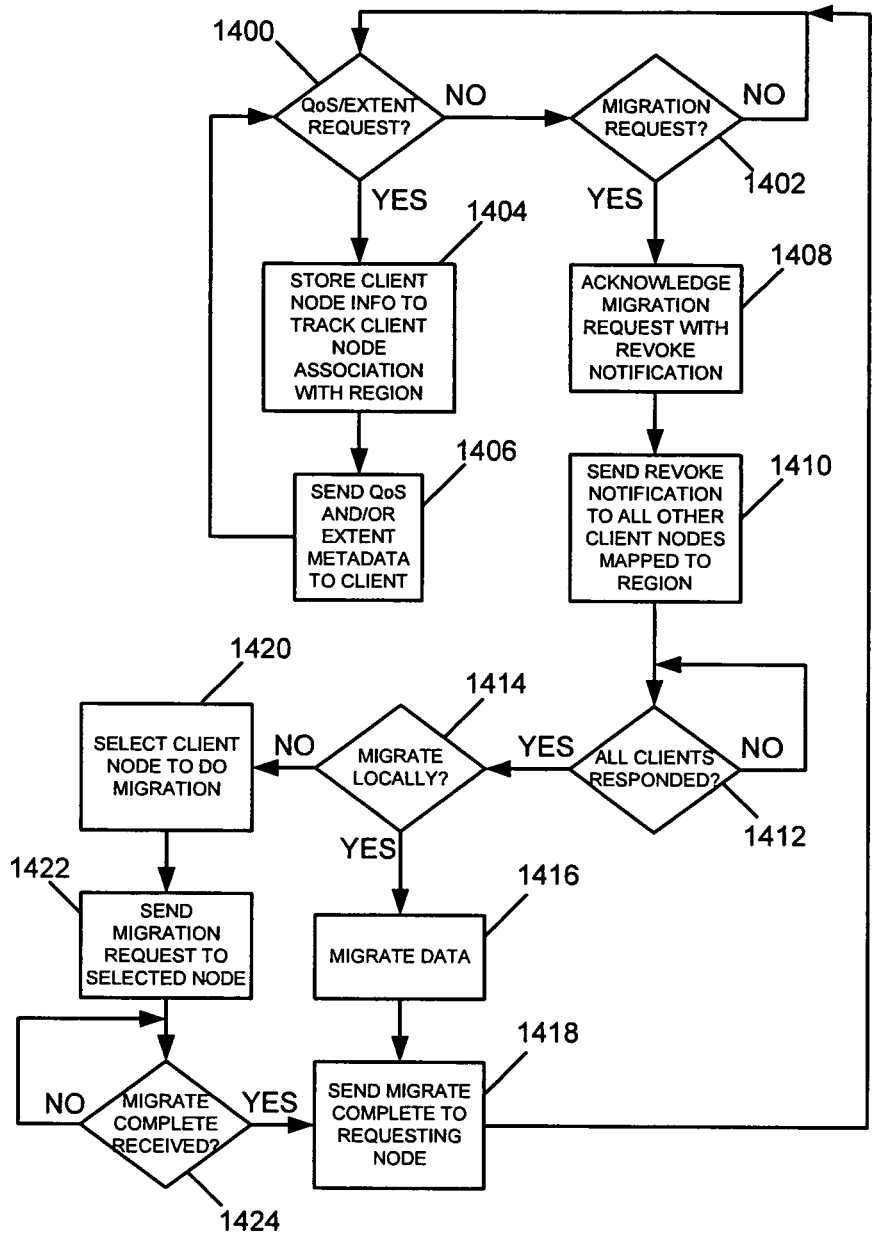
FIG. 14 is a flow chart illustrating a server-side process for managing quality of service for shared storage accessed by a plurality of nodes sharing access to a disk array where the server migrates data associated with a QoS violation or delegates the migration to a client node according to an embodiment of the subject matter described herein.

FIG. 14 is a server-side process for managing quality of service for shared storage accessed by a plurality of nodes sharing access to a disk array where the server may perform migration of data associated with a QoS violation or where the server may delegate the migration to a client node. At decision point 1400, the server may make a determination as to whether a QoS metadata and/or a storage extent metadata request has been received. When no QoS metadata and/or a storage extent metadata request has been received, the server may make a determination at decision point 1402 whether a migrate request has been received. When no migrate request has been received, the server may iteratively check for reception of a QoS metadata and/or a storage extent metadata request and a migration request at decision points 1400 and 1402, respectively.

When a QoS metadata and/or a storage extent metadata request has been received at decision point 1400, the server may store information associated with the client node to track the client node association with the region of the disk array at block 1404. At block 1406, the server may send the QoS metadata and/or a storage extent metadata to the requesting node and the process may return to decision point 1402 and iterate as described above.

When a migration request has been received at decision point 1402, the server may acknowledge the migration request by sending a revoke notification message, such as the notify revoke region messages in line 2 of FIGS. 6 through 9, to the requesting node at block 1408. At block 1410, the server may send a revoke notification message to any other nodes with associations that have been tracked with the region, such as the notify revoke region messages in line 3 of FIGS. 6 through 9.

At decision point 1412, the server may wait for responses from all client nodes with tracked associations for the region to which revoke notify messages were sent. For example, when the client nodes have revoked their storage extent mappings and QoS metadata for the logical region of the disk array they may respond to the notify revoke message by formulating and sending a revoke response as in any of lines 4 and 5 of FIGS. 6 through 9. Upon receipt of all anticipated revoke responses, the server may make a determination at decision point 1414 as to whether to migrate the data locally (e.g., a server migration) or whether to choose a client node to migrate the data.

When a determination is made to migrate the data locally, the data may be migrated at block 1416 and a migrate complete message may be sent to the requesting node at block 1418. As described above, a migrate complete message may optionally be sent to all client nodes with tracked associations for the region to which the revoke notify messages were sent.

When a determination is made not to migrate the data locally, a client node may be selected to migrate the data at block 1420 and a migration request may be sent to the selected node at block 1422. As described above, the migration request message may optionally include QoS metadata for the physical disks associated with the destination of the migrate operation in order to enhance the process.

At decision point 1424, the server may wait for a migrate complete message to be received. When a migrate complete message has been received, the server may send a migrate complete message to the requesting node at block 1418 and the server may return to decision point 1400 to wait for a QoS metadata and/or a storage extent metadata request or a migration request at decision point 1402.

As described above, when the requesting node which initiated the migration request at decision point 1402 is chosen to migrate the data at block 1402 and when the server has optionally included QoS metadata for the physical disks associated with the destination of the migrate operation in order to enhance the process, block 1418 may be skipped and the server may return to decision point 1400 as described above because the requesting client node may recognize by the inclusion of the QoS metadata associated with the physical disks for the migration destination that it is operating to complete the migration operation and that no further messaging is needed.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for managing quality of service for shared storage accessed by a plurality of nodes, the method comprising:
at a client node of a plurality of nodes separate from and sharing access to a first disk array:
requesting, from a server, first quality-of-service (QoS) metadata associated with a first portion of the first disk array, wherein the first QoS metadata includes at least one performance criterion for the first portion of the first disk array;
obtaining, from the server, a map including physical disk access information for the first portion of the first disk array, wherein the physical disk access information includes a physical address of a location within a disk of the disk array;
receiving the first QoS metadata;
monitoring I/O performance for the first portion of the first disk array, wherein monitoring I/O performance for the first portion of the first disk array includes monitoring the first portion of the first disk array directly without interaction with the server using the physical disk access information included within the map;
comparing the monitored I/O performance with the first QoS metadata;
determining, without interaction with the server and based upon the comparison of the monitored I/O performance with the first QoS metadata, whether a QoS violation has occurred; and
in response to determining that a QoS violation has occurred, effecting migration of data associated with the first portion of the first disk array, wherein each of the plurality of client nodes is adapted to send a request for the first QoS metadata to the server and wherein the request includes, for a sending node, identifying information for the sending node and wherein the server is adapted to store the identifying information to create an association between the sending node and the first portion of the first disk array to indicate that the sending node has an I/O mapping to the first portion of the first disk array.

2. The method of claim 1 wherein determining whether a QoS violation has occurred includes determining whether at least a portion of the data associated with the first portion of the first disk array resides on disparately performing storage devices associated with the first disk array.

3. The method of claim 1 wherein determining whether a QoS violation has occurred includes determining whether at least a first portion of the data associated with the first portion of the first disk array is accessed more frequently than a second portion of the data.

4. The method of claim 1 wherein determining whether a QoS violation has occurred includes determining whether at least a portion of the data associated with the first portion of the first disk array is stored on storage devices with different cost attributes.

5. The method of claim 1 wherein determining whether a QoS violation has occurred includes determining whether at least a portion of the data associated with the first portion of the first disk array is stored on storage devices with different security attributes.

6. The method of claim 1 wherein effecting migration of data associated with the first portion of the disk array includes using the server to copy the data associated with the first portion of the first disk array to a second portion of the first disk array.

7. The method of claim 1 wherein effecting migration of data associated with the first portion of the disk array includes using the server to copy the data associated with the first portion of the first disk array to a first portion of a second disk array.

8. The method of claim 1 wherein effecting migration of data associated with the first portion of the disk array includes using the client node to copy the data associated with the first portion of the disk array.

9. The method of claim 8, comprising receiving, at the client node, as part of a request from the server that the client node migrate the data, a source location including first physical disk access information and a destination location including second physical disk access information and wherein effecting migration of data includes copying the data from the source location using the first physical disk access information to the destination location using the second physical disk access information.

10. The method of claim 8 comprising receiving, at the client node, as part of a request from the server that the client node migrate the data, a source location including first physical disk access information, a destination location including second physical disk access information, and second QoS metadata associated with the destination location and wherein the effecting migration of data includes copying the data from the source location using the first physical disk access information to the destination location using the second physical disk access information and using the second QoS metadata to monitor I/O performance for the destination location.

11. The method of claim 1 wherein the at least one performance criterion for the first portion of the first disk array includes at least one of a maximum average response time for read operations, a maximum average response time for write operations, a maximum response time for read operations, a maximum response time for write operations, a minimum throughput for read operations per unit time, and a minimum throughput for write operations per unit time.

12. The method of claim 1 comprising maintaining a variance tolerance for the at least one performance criterion and calculating a weighted average for a plurality of monitored I/O performance values and wherein comparing the monitored I/O performance with the first QoS metadata includes comparing the weighted average with the at least one performance criterion and wherein determining whether a QoS violation has occurred includes identifying a variance associated with the weighted average that is larger than the variance tolerance.

13. The method of claim 1 wherein the at least one performance criterion comprises a threshold and wherein comparing the monitored I/O performance with the first QoS metadata includes comparing the monitored I/O performance with the threshold and wherein determining whether a QoS violation has occurred includes determining whether the threshold has been exceeded.

14. The method of claim 1 comprising maintaining a fuzzy logic algorithm based upon the at least one performance criterion and wherein comparing the monitored I/O performance with the first QoS metadata includes executing the fuzzy logic algorithm on the monitored I/O performance and wherein determining whether a QoS violation has occurred includes determining whether the result of executing the fuzzy logic algorithm indicates that the at least one performance criterion is in danger of being exceeded.

15. A method for managing quality of service for shared storage accessed by a plurality of nodes, the method comprising:
at a server serving a plurality of client nodes separate from and sharing access to a first disk array:
receiving a request for quality-of-service (QoS) metadata from a first client node of the plurality of nodes, wherein the request for QoS metadata is associated with a first portion of the first disk array;
providing, to the first client node, a map including physical disk access information for the first portion of the first disk array, wherein the physical disk access information includes a physical address of a location within a disk of the disk array;
in response to receiving the first request for QoS metadata, sending, to the first client node, first QoS metadata including at least one performance criterion for the first portion of the first disk array, wherein the first client node monitors the first portion of the first disk array directly without interaction with the server using the physical disk access information included within the map and uses the first QoS metadata in determining, without interaction with the server, whether to initiate a request for data migration;
receiving a request from the first client node to migrate data associated with the first portion of the first disk array; and
effecting migration of the data associated with the first portion of the first disk array, wherein each of the plurality of client nodes is adapted to send a request for the first QoS metadata to the server and wherein the request includes, for a sending node, identifying information for the sending node and wherein the server is adapted to store the identifying information to create an association between the sending node and the first portion of the first disk array to indicate that the sending node has an I/O mapping to the first portion of the first disk array.

16. The method of claim 15 wherein the first request for QoS metadata includes identifying information for the first client node of the plurality of client nodes and wherein the method further comprises storing the identifying information to create an association between the first client node and the first portion of the first disk array.

17. The method of claim 15 comprising sending, in response to receiving the request to migrate data associated with the portion of the first disk array, a revoke message to nodes within the plurality of client nodes with input/output (I/O) associations with the first portion of the first disk array.

18. The method of claim 17 wherein effecting migration of the data includes, in response to determining to delegate migration to a node of the plurality of nodes, selecting a node from the plurality of client nodes to migrate the data associated with the first portion of the first disk array.

19. The method of claim 18 wherein effecting migration of the data includes, in response to selecting a node from the plurality of nodes to migrate the data, sending a migrate request to the selected node including first physical disk access information for the first portion of the first disk array and second physical disk access information identifying a second portion of the first disk array as a destination location for data migration.

20. The method of claim 18 wherein effecting migration of the data includes, in response to selecting a node from the plurality of client nodes to migrate the data, sending a migrate request to the selected node including first physical disk access information for the first portion of the first disk array and second physical disk access information identifying a first portion of a second disk array as a destination location for data migration.

21. The method of claim 18 wherein effecting migration of the data includes, in response to selecting the first client node from the plurality of client nodes to migrate the data, sending a migrate request to the first client node including first physical disk access information for the first portion of the first disk array, second physical disk access information identifying a second portion of the first disk array as a destination location for data migration, and second QoS metadata for the second portion of the first disk array.

22. The method of claim 18 wherein effecting migration of the data includes, in response to selecting the first client node from the plurality of client nodes to migrate the data, sending a migrate request to the first client node including first physical disk access information for the first portion of the first disk array, second physical disk access information identifying a first portion of a second disk array as a destination location for data migration, and second QoS metadata for the first portion of the second disk array.

23. The method of claim 15 wherein effecting migration of the data associated with the first portion of the first disk array includes determining whether to migrate the data at the server or to delegate migration to a node within the plurality of client nodes.

24. The method of claim 23 wherein effecting migration of the data includes, in response to determining to migrate the data at the server, using the server to copy the data from the first portion of the first disk array to a second portion of the first disk array.

25. The method of claim 23 wherein effecting migration of the data includes, in response to determining to migrate the data at the server, using the server to copy the data from the first portion of the first disk array to a first portion of a second disk array.

26. The method of claim 15 wherein the at least one performance criterion for the portion includes at least one of a maximum average response time for read operations, a maximum average response time for write operations, a maximum response time for read operations, a maximum response time for write operations, a minimum throughput of read operations per unit time, and a minimum throughput of write operations per unit time.

27. A system for managing quality of service for shared storage accessed by a plurality of nodes, the system comprising:
 a first disk array; and
 a server for providing first quality-of-service (QoS) metadata associated with a first portion of the first disk array, wherein the first QoS metadata includes at least one performance criterion for the first portion of the first disk array, and a map including physical disk access information for the first portion of the first disk array, wherein the physical disk access information includes a physical address of a location within a disk of the disk array; and
 a plurality of client nodes for detecting QoS violations related to the first portion of the first disk array, each of the plurality of client nodes being separate from the first disk array and adapted to:
 request, from the server, the first QoS metadata;
 obtain, from the server, the map;
 receive the first QoS metadata;
 monitor input/output (I/O) performance for the first portion of the first disk array, wherein monitor I/O performance for the first portion of the first disk array includes monitoring the first portion of the first disk array directly without interaction with the server using the physical disk access information included within the map;
 compare the monitored I/O performance with the first QoS metadata;
 and determine, without interaction with the server and based upon the comparison of the monitored I/O performance with the first QoS metadata, whether a QoS violation has occurred, wherein each of the plurality of client nodes is adapted to send a request for the first QoS metadata to the server and wherein the request includes, for a sending node, identifying information for the sending node and wherein the server is adapted to store the identifying information to create an association between the sending node and the first portion of the first disk array to indicate that the sending node has an I/O mapping to the first portion of the first disk array.

28. The system of claim 27 wherein each of the plurality of client nodes is adapted to request, in response to determining that a QoS violation has occurred, that the server migrate data associated with the first portion of the first disk array.

29. The system of claim 28 wherein the server is adapted to send, in response to receiving a request to migrate data associated with the first portion of the first disk array from the sending node, a revoke message to nodes of the plurality of nodes with input/output (I/O) associations with the first portion of the first disk array.

30. The system of claim 28 wherein the server is adapted to determine, in response to receiving a request that the server migrate data associated with the first portion of the first disk array from a requesting node, whether to migrate the data at the server or to select a node from the plurality of nodes to migrate the data.

31. The system of claim 30 wherein the server is adapted to copy, in response to determining to migrate the data at the server, the data from the first portion of the first disk array to a second portion of the first disk array.

32. The system of claim 30 wherein the server is adapted to copy, in response to determining to migrate the data at the server, the data from the first portion of the first disk array to a first portion of a second disk array.

33. The system of claim 30 wherein the server is adapted to send, in response to selecting a node of the plurality of nodes to migrate the data, a migrate request to the selected node including first physical disk access information for the first portion of the first disk array and second physical disk access information identifying a second portion of the first disk array as a destination location for data migration.

34. The system of claim 30 wherein the server is adapted to send, in response to selecting a node of the plurality of nodes to migrate the data, a migrate request to the selected node including first physical disk access information for the first portion of the first disk array and second physical disk access information identifying a first portion of a second disk array as a destination location for data migration.

35. The system of claim 30 wherein the server is adapted to send, in response to selecting the requesting node to migrate the data, a migrate request to the requesting node including first physical disk access information for the first portion of the first disk array, second physical disk access information identifying a second portion of the first disk array as a destination location for data migration, and second QoS metadata for the second portion of the first disk array.

36. The system of claim 30 wherein the server is adapted to send, in response to selecting the requesting node to migrate the data, a migrate request to the requesting node including first physical disk access information for the first portion of the first disk array, second physical disk access information identifying a first portion of a second disk array as a destination location for data migration, and second QoS metadata for the first portion of the second disk array.

37. The system of claim 27 wherein, in determining whether a QoS violation has occurred, each client node is adapted to determine whether at least a portion of the data associated with the first portion of the first disk array resides on disparately performing storage devices associated with the first disk array.

38. The system of claim 27 wherein, in determining whether a QoS violation has occurred, each client node is adapted to determine whether at least a first portion of the data associated with the first portion of the first disk array is accessed more frequently than a second portion of the data.

39. The system of claim 27 wherein, in determining whether a QoS violation has occurred, each client node is adapted to determine whether at least a portion of the data associated with the first portion of the first disk array is stored on storage devices with different cost attributes.

40. The system of claim 27 wherein, in determining whether a QoS violation has occurred, each client node is adapted to determine whether at least a portion of the data associated with the first portion of the first disk array is stored on storage devices with different security attributes.

41. The system of claim 27 wherein the at least one performance criterion for the first portion of the first disk array includes at least one of a maximum average response time for read operations, a maximum average response time for write operations, a maximum response time for read operations, a maximum response time for write operations, a minimum throughput for read operations per unit time, and a minimum throughput for write operations per unit time.

42. The system of claim 27 wherein each of the plurality of client nodes is adapted to store a variance tolerance for the at least one performance criterion, to calculate a weighted average for a plurality of monitored I/O performance values, to compare the weighted average with the at least one performance criterion and wherein, in determining whether a QoS violation has occurred, each client node is adapted to identify a variance associated with the weighted average that is larger than the variance tolerance.

43. The system of claim 27 wherein each of the plurality of client nodes is adapted to use the at least one performance criterion as a threshold and, in comparing the monitored I/O performance with the first QoS metadata, each client node is adapted to compare the monitored I/O performance with the threshold and wherein, in determining whether a QoS violation has occurred, each client node is adapted to determine whether the threshold has been exceeded.

44. The system of claim 27 wherein each of the plurality of client nodes is adapted to maintain a fuzzy logic algorithm based upon the at least one performance criterion and wherein, in comparing the monitored I/O performance with the first QoS metadata, each client node is adapted to execute the fuzzy logic algorithm on the monitored I/O performance and wherein, in determining whether a QoS violation has occurred, each client node is adapted to determine whether the result of executing the fuzzy logic algorithm indicates that the at least one performance criterion is in danger of being exceeded.

45. A non-transitory computer readable medium having stored thereon executable instructions that when executed by the processor of a computer control the computer to perform steps comprising:
    at a client node of a plurality of client nodes separate from and sharing access to a first disk array:
        requesting first quality-of-service (QoS) metadata associated with a first portion of the first disk array from a server, wherein the QoS metadata includes at least one performance criterion for the first portion of the first disk array;
        obtaining, from the server, a map including physical disk access information for the first portion of the first disk array, wherein the physical disk access information includes a physical address of a location within a disk of the disk array;
        monitoring I/O performance for the first portion of the first disk array, wherein monitoring I/O performance for the first portion of the first disk array includes monitoring the first portion of the first disk array directly without interaction with the server using the physical disk access information included within the map;
        comparing the monitored I/O performance with the QoS metadata;
        determining, without interaction with the server and based upon the comparison of the monitored I/O performance with the QoS metadata, whether a QoS violation has occurred; and
        in response to determining that a QoS violation has occurred, effecting migration of data associated with the first portion of the first disk array, wherein each of the plurality of client nodes is adapted to send a request for the first QoS metadata to the server and wherein the request includes, for a sending node, identifying information for the sending node and wherein the server is adapted to store the identifying information to create an association between the sending node and the first portion of the first disk array to indicate that the sending node has an I/O mapping to the first portion of the first disk array.

* * * * *